(12) United States Patent
Sana et al.

(10) Patent No.: US 6,860,957 B2
(45) Date of Patent: Mar. 1, 2005

(54) AUTOMATIC PREPREG LAMINATING METHOD AND APPARATUS FOR CARRYING OUT THE SAME

(75) Inventors: Toshikazu Sana, Kakamigahara (JP);
Akira Murai, Minokamo (JP);
Shunichi Bandoh, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 64 days.

(21) Appl. No.: 10/458,380

(22) Filed: Jun. 11, 2003

(65) Prior Publication Data

US 2004/0026025 A1 Feb. 12, 2004

(30) Foreign Application Priority Data

Jun. 13, 2002 (JP) ........................................ 2002-173242
Jun. 20, 2002 (JP) ........................................ 2002-180128
Jun. 20, 2002 (JP) ........................................ 2002-180318

(51) Int. Cl.$^7$ ............................................ B32B 31/00
(52) U.S. Cl. ..................... 156/245; 156/256; 156/263; 156/289; 156/511; 264/258; 264/267
(58) Field of Search ................................ 156/245, 256, 156/263, 264, 289, 511; 264/258, 267, 268, 275

(56) References Cited

U.S. PATENT DOCUMENTS

| | | | | |
|---|---|---|---|---|
| 3,996,089 A | * | 12/1976 | More et al. .................. | 156/235 |
| 4,285,752 A | * | 8/1981 | Higgins ....................... | 156/250 |
| 4,514,246 A | * | 4/1985 | Forrer et al. ................. | 156/264 |
| 4,708,761 A | | 11/1987 | Taniguchi et al. | |
| 5,397,415 A | * | 3/1995 | Manabe et al. .............. | 156/234 |
| 5,874,033 A | * | 2/1999 | Meeker ....................... | 264/138 |

* cited by examiner

*Primary Examiner*—Mark A. Osele
(74) *Attorney, Agent, or Firm*—Oliff & Berridge, PLC

(57) ABSTRACT

A first parting film is held on a first flat laminating table in close contact with the first flat laminating table, and then wide prepregs are laid for plane lamination on the first parting film to form a large prepreg-laminate having a large area. A second parting film is held on a second flat laminating table in close contact with the second flat laminating table by suction, and then narrow prepregs to form a gridlike prepreg-laminate. The large prepreg-laminate is floated up by jetting air from the first flat laminating table is cut on a cutting table to obtain a prepreg-laminate skin. The gridlike prepreg-laminate is processed similarly to obtain a prepreg-laminate doubler. The prepreg-laminate skin and the prepreg-laminate doubler are carried from the cutting table to a laminating mold having a single-contour laminating surface so as to be superposed and are laminated to form a composite panel.

14 Claims, 31 Drawing Sheets

AUTOMATIC PREPREG LAMINATING METHOD AND APPARATUS FOR CARRYING OUT THE SAME

BACKGROUND OF THE INVENTION

1. Field of the Invention

The present invention relates to an automatic prepreg laminating method and an apparatus for carrying out the same for manufacturing a composite panel of a CFRP or the like to be used as panels for forming fuselages and wings of aircraft, bodies and fairings of rockets and such.

2. Description of the Related Art

Composite panels of CFRPs have become used prevalently, instead of metal panels, on outer surfaces of various parts including fuselages and wings of aircraft to reduce the weight of aircraft. An automatic prepreg-laminating machine, generally called ATL, was developed and has been used for manufacturing a composite panel. This known automatic prepreg laminating machine laminates prepregs directly on an upper molding surface, serving as a contour-molding surface, of a laminate molding mold.

Although this known automatic prepreg laminating machine has a function to perform numerical control in laminating unidirectional prepregs having a width of 3 in. or 6 in., the automatic prepreg laminating machine takes much time to form laminates having a large area and those having a big thickness and is unable to form laminates efficiently because the automatic prepreg laminating machine is able to laminate only narrow prepregs.

A recently developed fiber placement machine, generally called FPM, is capable of laminating prepregs on a laminating mold having a complicated contour-molding surface, and is characterized in a capability of simultaneously laminating tens of narrow prepregs of a width in the range of 3 to 10 mm. However, since the prepregs are very narrow, as mentioned above, the fiver placement machine takes more time for forming a laminate of a unit area than the automatic prepreg laminating machine and operates at very low efficiency.

Since the laminating mold is bound by automatic prepreg lamination when prepregs are laminated directly on the laminating mold, other work cannot be performed on the laminating mold during automatic prepreg lamination. Thus, those known machines are unsuitable for manufacturing panels at a high production rate.

Each of those know machines is provided with a laminating head having a ten-axis control function and a prepreg cutting function to laminate prepregs on the laminating mold having a three-dimensional contour molding surface. The laminating head is very heavy and the machine is inevitably large.

The prepreg cutting function is able to cut prepregs only linearly and is unable to cut prepregs in delicate shapes.

The control of the laminating head requires a very high arithmetic ability to laminate prepregs on a laminating mold having a complicated contour-molding surface and takes much time. Consequently, lamination of prepregs to form a laminate takes much time and prepregs cannot efficiently be laminated.

SUMMARY OF THE INVENTION

Accordingly, it is an object of the present invention to provide an automatic prepreg laminating method and an automatic prepreg laminating machine having individual functions obtained by separating the functions of a conventional all-in-one automatic prepreg laminating machine, and capable of efficiently carrying out prepreg lamination by exercising the individual functions.

According to the present invention, an automatic prepreg laminating method comprises the steps of: spreading a first parting film on a first flat laminating table in close contact with the surface of the first flat laminating table, and laying a plurality of wide prepregs on the first parting film to form a large prepreg-laminate having a large area; spreading a second parting film on a second flat laminating table in close contact with the surface of the second flat laminating table, and laying a plurality of narrow prepregs at intervals on the second parting film to form a narrow prepreg-laminate; cutting the large prepreg-laminate on a cutting table to form a prepreg-laminate skin; cutting the narrow prepreg-laminate on the cutting table to form a prepreg-laminate doubler; and successively carrying the prepreg-laminate skin and the prepreg-laminate doubler from the cutting table onto a laminating mold to laminate the prepreg-laminate skin and the prepreg-laminate doubler.

According to the present invention, the first parting film and the large prepreg-laminate laid on the first flat laminating table are floated up by air jetted from the first flat laminating table, are carried in the air and are laid on the cutting table with the first parting film facing the cutting table, the second parting film and the narrow prepreg-laminate laid on the second flat laminating table are floated up by air jetted from the second flat laminating table, are carried in the air and are laid on the cutting table with the second parting film facing the cutting table, and the prepreg-laminate skin and the prepreg-laminate doubler are suspended in the air like a suspended curtain in carrying the prepreg-laminate skin and the prepreg-laminate doubler from the cutting table onto the laminating mold.

According to the present invention, the molding surface of the laminating mold is a single-contour molding surface, the prepreg-laminate skin is pulled up with the first parting film held by suction on the cutting table to separated the prepreg-laminate skin from the first parting film in suspending the prepreg-laminate skin, and the prepreg-laminate doubler is pulled up together with the second parting film from the cutting table in suspending the prepreg-laminate doubler, is carried in the air together with the second parting film and is laid with the second parting film facing up on the prepreg-laminate skin laid on the laminating mold to laminate the prepreg-laminate doubler to the prepreg-laminate skin, and then the second parting film is removed.

According to the present invention, the laminating mold has a double-contour molding surface, when forming the large prepreg-laminate having a large area, the first parting film is spread on the first flat table in close contact with the surface of the first flat table and the wide prepregs are arranged at intervals on the first parting film; when forming the prepreg-laminate skin on the cutting table by cutting the large-laminate, the prepreg-laminate skin becomes gapped; and after laminating the gapped prepreg-laminate skin on the laminating mold, wide prepregs are additionally laid in gaps in the gapped prepreg-laminate skin on the laminating mold.

According to the present invention, the prepreg-laminate doubler is pulled up together with the second parting film from the cutting table, is carried together with the second parting film in the air and is laminated with the second parting film facing up to the gapless prepreg-laminate skin formed on the laminating mold, and then the second parting film is removed.

According to the present invention, the automatic prepreg laminating method further comprises the steps of: spreading a third parting film on a third flat laminating table, holding the third parting film in close contact with the surface of the third flat laminating table by suction, and forming a scattered prepreg-laminate by laying narrow prepregs in a scattered arrangement and laminating the narrow prepregs on the third parting film; and forming a prepreg-laminate local reinforcement by cutting the scattered prepreg-laminate on the cutting table; wherein the prepreg-laminate local reinforcement is carried from the cutting table and laminated to a laminate structure formed on the laminating mold by laminating the prepreg-laminate skin and the prepreg-laminate doubler.

According to the present invention, the prepreg-laminate skin is pulled up with the first parting film held by suction on the cutting table to separated the prepreg-laminate skin from the first parting film in suspending the prepreg-laminate skin, the prepreg-laminate doubler and the prepreg-laminate local reinforcement are pulled up, respectively, together with the second parting film and the third parting film from the cutting table in suspending the prepreg-laminate doubler and the prepreg-laminate local reinforcement, the prepreg-laminate doubler and the prepreg-laminate local reinforcement are carried in the air together with the second parting film and the third parting film, respectively, the second parting film is removed after laying the prepreg-laminate doubler with the second parting film facing up on the prepreg-laminate skin, the third parting film is removed after laying the prepreg-laminate local reinforcement with the third parting film facing up on the prepreg-laminate doubler laid on the prepreg-laminate skin laid on the laminating mold when laminating the prepreg-laminate skin, the prepreg-laminate doubler and the prepreg-laminate local reinforcements.

According to the present invention, the laminating mold has a double-contour molding surface, when forming the large prepreg-laminate having a large area, the first parting film is spread on the fist flat table in close contact with the first flat table and the wide prepregs are arranged at intervals on the first parting film; and when forming the prepreg-laminate skin on the cutting table by cutting the large gapped prepreg-laminate, the prepreg-laminate skin becomes gapped; and after laminating the gapped prepreg laminate skin on the laminating mold, wide prepregs are additionally laid in gaps in the gapped prepreg-laminate skin on the laminating mold.

According to the present invention, the large prepreg-laminate having a large area is formed by laying wide, unidirectional and/or bidirectional prepregs in a four-axis control mode on the first parting film spread on the first flat laminating table in close contact with the surface of the first flat laminating table.

According to the present invention, the narrow prepreg-laminate is formed by longitudinally and laterally laying narrow unidirectional and/or bidirectional prepregs respectively having different widths at predetermined intervals in a four-axis control mode on the second parting film spread on the second flat laminating table in close contact with the surface of the second laminating table.

According to the present invention, an automatic prepreg laminating method comprises the steps of: forming a large prepreg-laminate having a large area by laminating a plurality of wide prepregs on a first flat laminating table; forming a narrow prepreg-laminate by laminating a plurality of narrow prepregs on a second flat laminating table; forming a prepreg-laminate skin by cutting the large prepreg-laminate on a cutting table; forming a prepreg-laminate doubler by cutting the narrow prepreg-laminate on the cutting table; and successively carrying the cut prepreg-laminate skin and the cut prepreg-laminate doubler from the cutting table onto a laminating mold having a contour molding surface.

According to the present invention, the laminating mold has a double-contour molding surface, when forming the large prepreg-laminate having a large area the wide prepregs are arranged at intervals; when forming the large prepreg-laminate skin on the cutting table by cutting the large prepreg-laminate, the prepreg-laminate skin becomes gapped; and after laminating the gapped prepreg-laminate skin on the laminating mold, wide prepregs are additionally laid in gaps in the gapped prepreg-laminate skin on the laminating mold.

According to the present invention, the large prepreg-laminate having a large area is formed by laying wide unidirectional and/or bidirectional prepregs in a four-axis control mode on the first parting film spread on a first flat laminating table in close contact with the surface of the first flat laminating table.

According to the present invention, the narrow prepreg-laminate is formed by longitudinally and laterally laying narrow unidirectional and/or bidirectional prepregs respectively having different widths at predetermined intervals in a four-axis control mode on a second parting film spread on the second flat laminating table in close contact with the surface of the second laminating table.

According to the present invention, an automatic prepreg laminating apparatus comprises: a wide-prepreg laminating unit including a first flat laminating table, and a first four-axis laminating head of a four-axis control system disposed above the first flat laminating table and capable of laying wide prepregs on the first flat laminating table; a narrow-prepreg laminating unit including a second flat laminating table, and a second four-axis laminating head of a four-axis control system disposed above the second flat laminating table and capable of laying narrow prepregs in a grid on the first flat laminating table; a prepreg-laminate cutting unit disposed between the wide-prepreg laminating unit and the narrow-prepreg laminating unit, including a cutting table and an automatic cutting device disposed above the cutting table, and capable of cutting prepreg-laminates transferred thereto respectively from the wide-prepreg laminating unit and the narrow-prepreg laminating unit; and a laminating mold adjoining the prepreg-laminate cutting unit, and having a single- or double-contour molding surface.

According to the present invention, the automatic prepreg laminating apparatus further comprises a scattered-prepreg laminating unit including a third flat laminating table; and a prepreg-laying position detecting template held above the third flat laminating table to detect positions of hand-laid narrow prepregs, or a third four-axis laminating head of a four-axis control system for laying narrow prepregs on the third flat laminating table.

According to the present invention, in the automatic prepreg laminating apparatus, the first, the second and the third flat laminating tables are provided with suction holes and air jetting holes.

According to the present invention, the automatic prepreg laminating apparatus further comprises sliding carrying machines capable of carrying a prepreg-laminate in the air and of moving between the wide-prepreg laminating unit and the prepreg-laminate cutting unit, between the narrow-prepreg laminating unit and the prepreg-laminate cutting unit, and between the scattered-prepreg laminating unit and the prepreg-laminate cutting unit, respectively.

According to the present invention, the automatic prepreg laminating apparatus further comprises a crane including hangers for suspending a prepreg-laminate, and capable of carrying a prepreg-laminate in the air and of moving between the prepreg-laminate cutting unit and the laminating mold.

According to the present invention, wherein the narrow-prepreg laminating unit is provided with prepreg cassettes respectively holding narrow prepregs therein and capable of being detachably attached to the second laminating head.

DESCRIPTION OF THE PREFERRED EMBODIMENTS

First Embodiment

Figure 1:
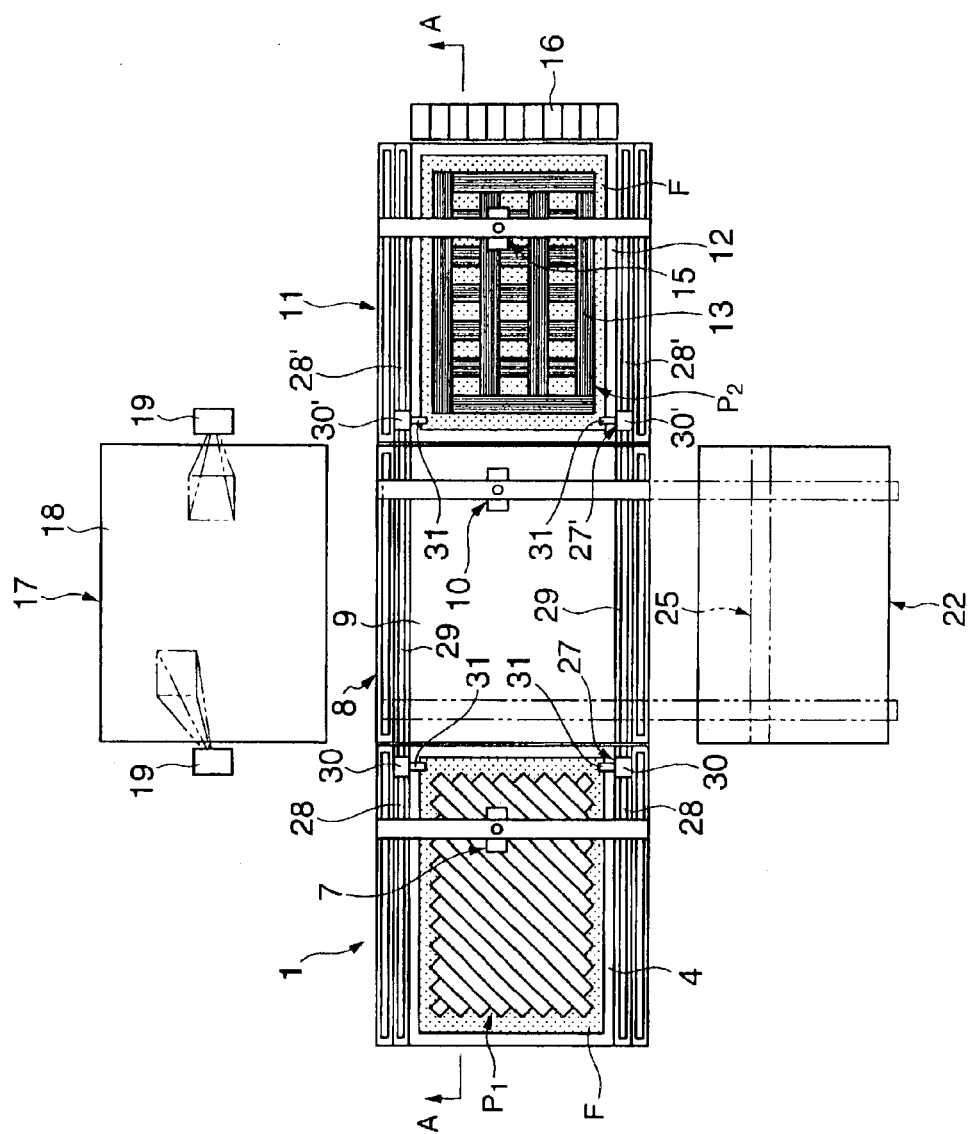
FIG. 1 is a schematic plan view of a composite panel manufacturing apparatus in a first embodiment according to the present invention for manufacturing composite panels for aircraft.

A first embodiment according to the present invention will be described with reference to the accompanying drawings. A composite panel manufacturing apparatus for carrying out a composite panel manufacturing method of manufacturing composite panels for aircraft will be explained with reference to FIGS. 1 to 3.

A wide-prepreg laminating unit 1 includes a flat laminating table (first flat laminating table) 4 of 10 m in width and 15 m in length provided with a plurality of small holes 2 opening in its upper surface for sucking and jetting air, and defining an air chamber 3 in its lower part; and an automatic laminating machine 7 provided with a four-axis laminating head 6 held above the flat laminating table 4 to lay unidirectional and/or bidirectional wide prepregs 5 of a width greater than 1 m on the flat laminating table 4 for plane lamination.

A prepreg-laminate cutting unit 8 adjoining the wide-prepreg laminating unit 1 includes a cutting table 9 of 10 m in width and 15 m in length provided with a plurality of small holes 2 opening in its upper surface for sucking and jetting air, and defining an air chamber 3 in its lower part; and an automatic cutting machine 10 held above the cutting table 9. A narrow-prepreg laminating unit 11 adjoining the prepreg-laminate cutting unit 8 includes a flat laminating table (second flat laminating table) 12 of 10 m in width and 15 m in length provided with a plurality of small holes 2 opening in its upper surface for sucking and jetting air, and defining an air chamber 3 in its lower part; and an automatic laminating machine 15 provided with a four-axis laminating head 14 held above the flat laminating table 12 to lay unidirectional and/or bidirectional narrow prepreg tapes 13 of a width in the range of 1 to 20 cm in a grid on the flat laminating table 12 for plane lamination. The narrow-prepreg laminating unit 11 is provided with a plurality of prepreg cassettes 16 respectively holding unidirectional or bidirectional narrow prepreg tapes 13 respectively having different widths. The prepreg cassettes 16 are selectively loaded to the laminating head 14.

A scattered-prepreg laminating unit 17 is disposed so as to adjoin the prepreg-laminate cutting unit 8 on one side of the longitudinal arrangement of the wide-prepreg laminating unit 1, the prepreg-laminate cutting unit 8 and the narrow-prepreg laminating unit 11. The scattered-prepreg laminating unit 17 includes a flat laminating table (third flat laminating table) 18 of 10 m in width and 15 m in length provided with a plurality of small holes 2 opening in its upper surface for sucking and jetting air, and defining an air chamber 3 in its lower part; and a prepreg-laying position detecting template 19 disposed above the third flat laminating table 18 to detect positions of hand-laid narrow prepregs.

Figure 4:
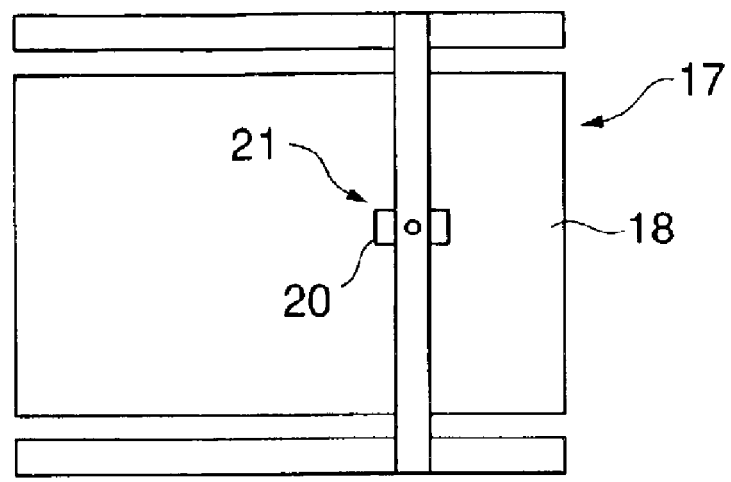
FIG. 4 is a plan view of another scattered-prepreg laminating unit for the composite panel manufacturing apparatus shown in FIG. 1.

Another scattered-prepreg laminating unit 17 shown in FIG. 4 includes a flat laminating table 18, and an automatic laminating machine 21 provided with a four-axis laminating head 20 held above the flat laminating table 18 to lay narrow prepregs of a width in the range of 10 to 20 mm in a scattered arrangement on the flat laminating table 18 for plane lamination.

Figure 2:
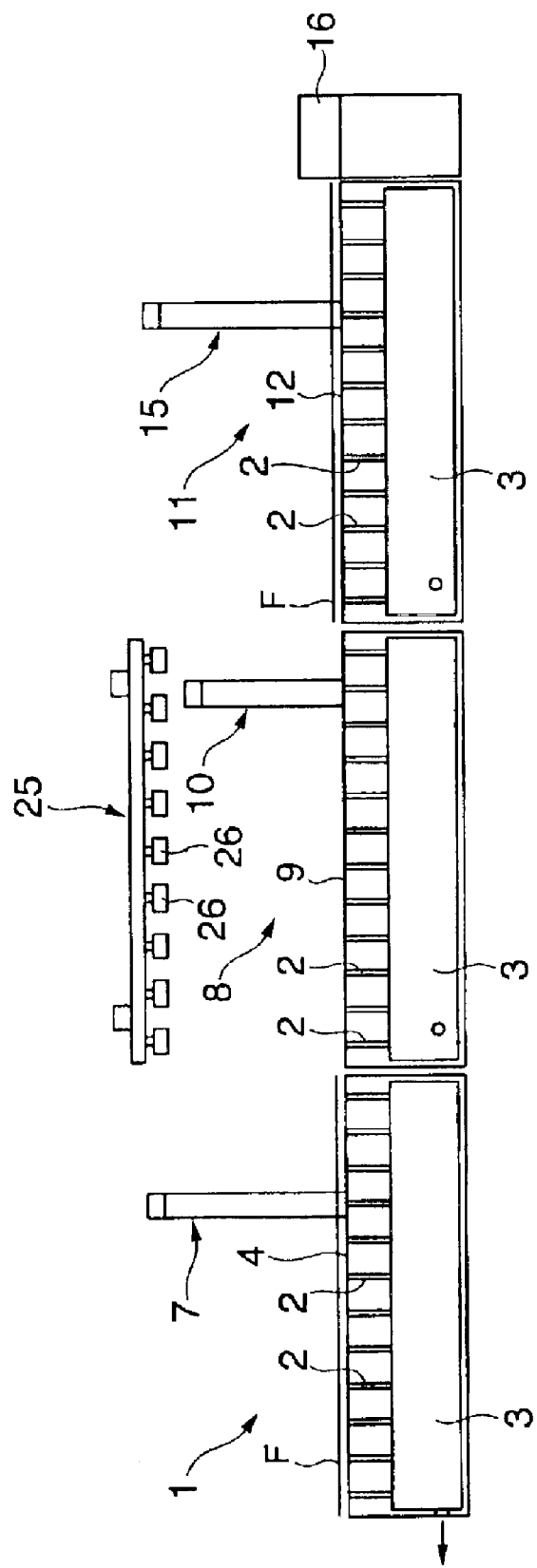
FIG. 2 is a view taken in the direction of the arrows along the line A—A in FIG. 1.
Figure 3:
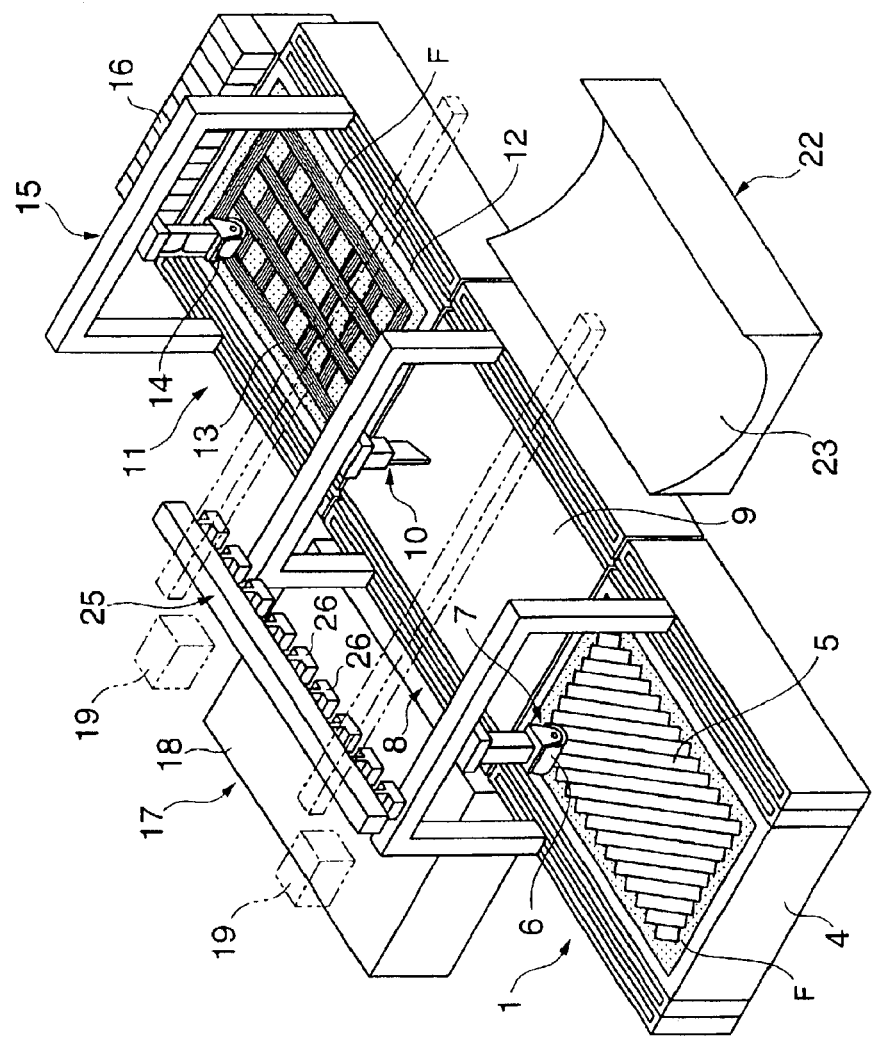
FIG. 3 is a perspective view of the composite panel manufacturing apparatus shown in FIG. 1.
Figure 5:
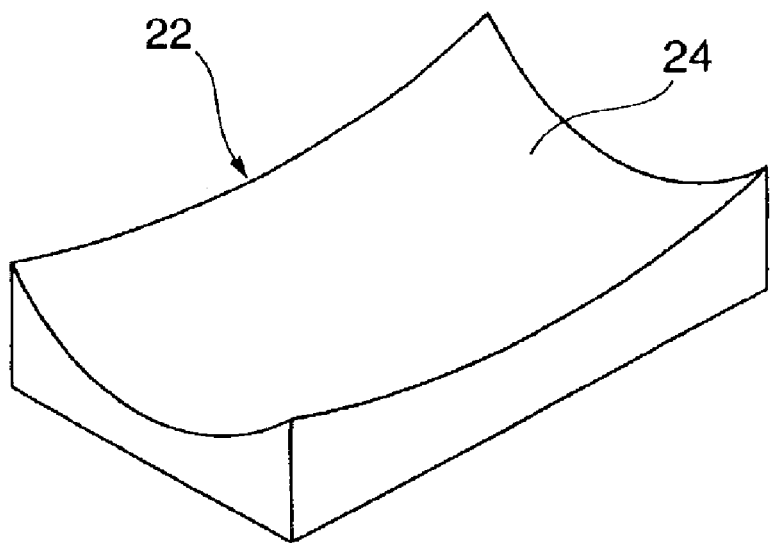
FIG. 5 is a perspective view of another prepreg-laminate laminating mold for the composite panel manufacturing apparatus shown in FIG. 1.

As shown in FIGS. 1 to 3, a prepreg-laminate laminating mold 22 is disposed opposite to the scattered-prepreg laminating unit 17 with respect to the prepreg-laminate cutting unit 8. The prepreg-laminate laminating mold 22 has either a single-contour molding surface 23 as shown in FIG. 3 or a double-contour molding surface 24 as shown in FIG. 5. As shown in FIGS. 1 to 3, a crane 25 is provided with hangers 26 for suspending a prepreg-laminate cut by the prepreg-laminate cutting unit 8 like a suspended curtain. The crane 25 moves between the prepreg-laminate cutting unit 8 and the prepreg-laminate laminating mold 22 to carry a cut prepreg-laminate in the air from the prepreg-laminate cutting unit 8 to the prepreg-laminate laminating mold 22.

Figure 6:
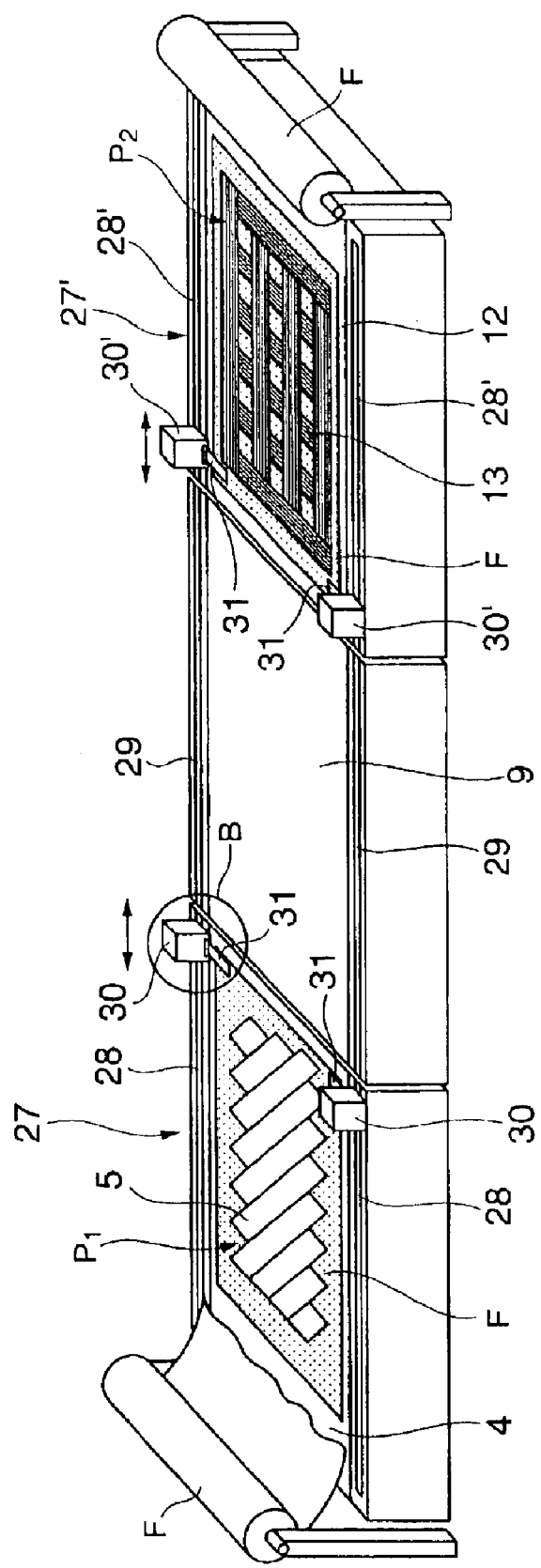
FIG. 6 is a schematic perspective view of a sliding carrying machine capable of moving between a wide-prepreg laminating unit and a prepreg-laminate cutting unit and between a narrow-prepreg laminating unit and the prepreg-laminate cutting unit and of carrying a prepreg-laminate in the air in the composite panel manufacturing apparatus shown in FIG. 1.
Figure 7:
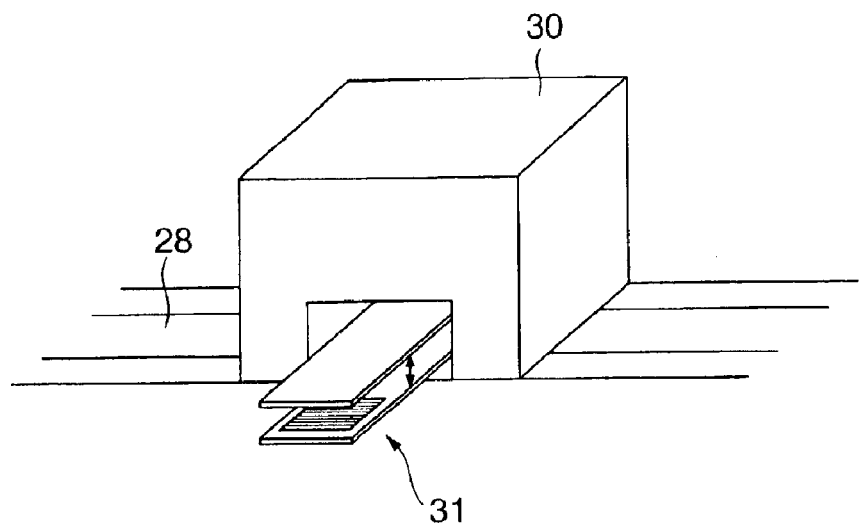
FIG. 7 is an enlarged perspective view of a part B in FIG. 6.

A sliding carrying machine 27 carries a prepreg-laminate from the wide-prepreg laminating unit 1 to the prepreg-laminate cutting unit 8. A sliding carrying machine 27' carries a prepreg-laminate from the narrow-prepreg laminating unit 11 to the prepreg-laminate cutting unit 8. As shown in FIGS. 6 and 7, the sliding carrying machine 27 includes carriages 30 that travel, respectively, along rails 28 extended along the opposite sides of the flat laminating table 4 of the wide-prepreg laminating unit 1 and rails 29 extended along the opposite sides of the cutting table 9 of the prepreg-laminate cutting unit 8, and grippers 31 mounted on the carriages 30 and capable of gripping the opposite side parts of a parting film F spread on the flat laminating table 4, respectively, and the sliding carrying machine 27' includes carriages 30' that travel, respectively, along rails 28' extended along the opposite sides of the flat laminating table 12 of the narrow-prepreg laminating unit 11 and the rails 29 extended along the opposite sides of the cutting table 9 of the prepreg-laminate cutting unit 8, and grippers 31 mounted on the carriages 30' and capable of gripping the opposite side parts of a parting film F spread on the flat laminating table 12, respectively.

Figure 8:
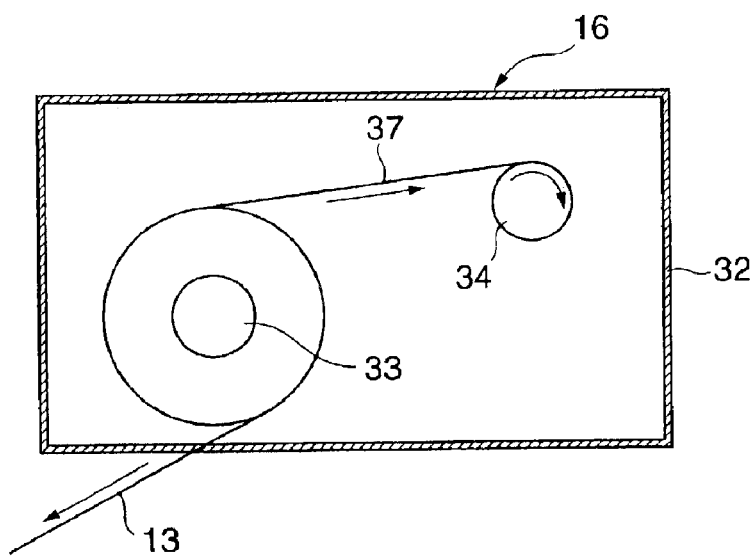
FIG. 8 is a longitudinal sectional view of a prepreg cassette included in the narrow-prepreg laminating unit of the composite panel manufacturing apparatus shown in FIG. 1.
Figure 9:
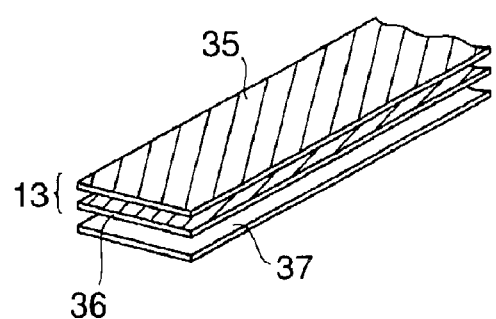
FIG. 9 is a perspective view of a prepreg tape and a carrying tape to be held in the prepreg cassette shown in FIG. 8.

Referring to FIG. 8, each of the plurality of prepreg cassettes 16 included in the narrow-prepreg laminating unit 11 of the composite panel manufacturing apparatus includes a case 32, a feed roller 33 placed in the case 32, and a take-up roller 34 placed in the case 32. A narrow prepreg tape 13 of a width in the range of 1 to 20 cm formed by combining, for example, a narrow 45°-reinforcement prepreg 35 and a narrow 0°-reinforcement prepreg 36 as shown in FIG. 9 is wound together with a backing strip 37 on the feed roller 33 with the free end of the backing strip 37 attached to the take-up roller 34. A desired one of the prepreg cassette 16 is loaded to the laminating head 14 shown in FIGS. 1 to 3.

When the laminating head 14 is moved in a four-axis control mode, the narrow prepreg tape 13 is unwound from the feed roller 33 and is laid on the flat laminating table 12 for lamination.

A various composite panel manufacturing methods according to the present invention to be carried out by the composite panel manufacturing apparatus in the first embodiment will be described.

A composite panel manufacturing method of manufacturing a single-contour composite panel, such as a fuselage panel not provided with any openings for windows, does not use the scattered-prepreg laminating unit 17, but uses a prepreg-laminate laminating mold 22 having a single-contour molding surface 23 as shown in FIG. 3.

Steps of the composite panel manufacturing method will be described. Referring to FIG. 2, a parting film (first parting film) F is spread on the flat laminating table 4 of the wide-prepreg laminating unit 1, air is sucked through the small holes 2 opening in the upper surface of the flat laminating table 4 and through the air chamber 3 extending under the small holes 2 to hold the parting film F in close contact with the flat laminating table 4 by suction. Then, as shown in FIG. 3, the laminating head 6 of the four-axis automatic laminating machine 7 lays unidirectional or bidirectional wide prepregs 5 of 1 m in width for plane lamination on the parting film F to form a large prepreg-laminate $P_1$ having a large area.

In the meantime, a parting film (second parting film) F is spread on the flat laminating table 12 of the narrow-prepreg laminating unit 11 as shown in FIG. 2, air is sucked through the small holes 2 opening in the upper surface of the flat laminating table 12 and through the air chamber 3 extending under the small holes 2 to hold the parting film F in close contact with the flat laminating table 12 by suction. Then, as shown in FIG. 3, the laminating head 14 of the four-axis automatic laminating machine 15 feeds the unidirectional narrow prepreg tape 13 of a width in the range of 1 to 20 cm from the prepreg cassette 16 and lays the narrow prepreg tape 13 longitudinally and laterally for plane lamination on the parting film F to form a gridlike prepreg-laminate (narrow prepreg-laminate) $P_2$.

As the narrow prepreg-laminate, a one-direction prepreg-laminate including a plurality of narrow prepreg tapes 13 extending along only one direction can be used, instead of the gridlike prepreg-laminate.

Then, air is jetted through the small holes 2 of the flat laminating table 4 to float up the large prepreg-laminate $P_1$ together with the parting film F. The grippers 31 mounted on the carriages 30 of the sliding carrying machine 27 shown in FIGS. 6 and 7 grip the opposite side parts of the parting film F floating over the flat laminating table 4, the carriages 30 travel along the rails 28 and 29 to the adjacent prepreg-laminate cutting unit 8 to carry the large prepreg-laminate $P_1$ together with the parting film F in the air and to place the large prepreg-laminate $P_1$ on the cutting table 9 of the prepreg-laminate cutting unit 8. The grippers 31 then, release the parting film F, and then air is sucked through the small holes 2 and the air chamber 3 of the cutting table 9 to hold the large prepreg-laminate $P_1$ and the parting film F on the cutting table 9 in close contact with the surface of the cutting table 9.

Figure 10:
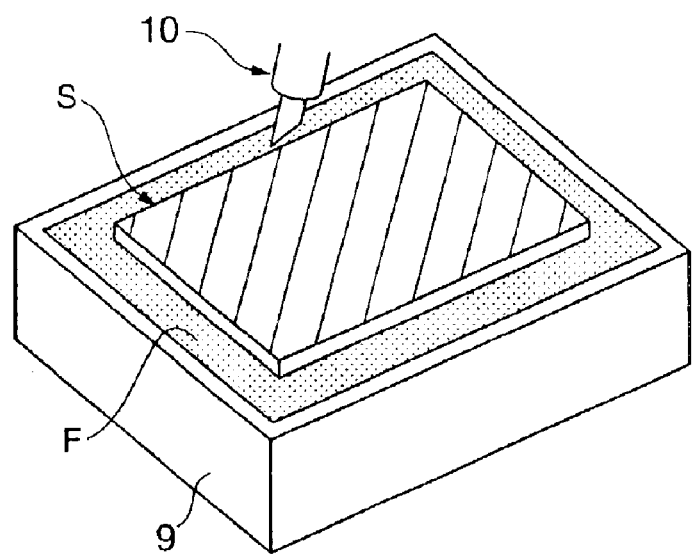
FIG. 10 is a perspective view of a prepreg-laminate skin obtained by cutting a large prepreg-laminate by the prepreg-laminate cutting unit.
Figure 11:
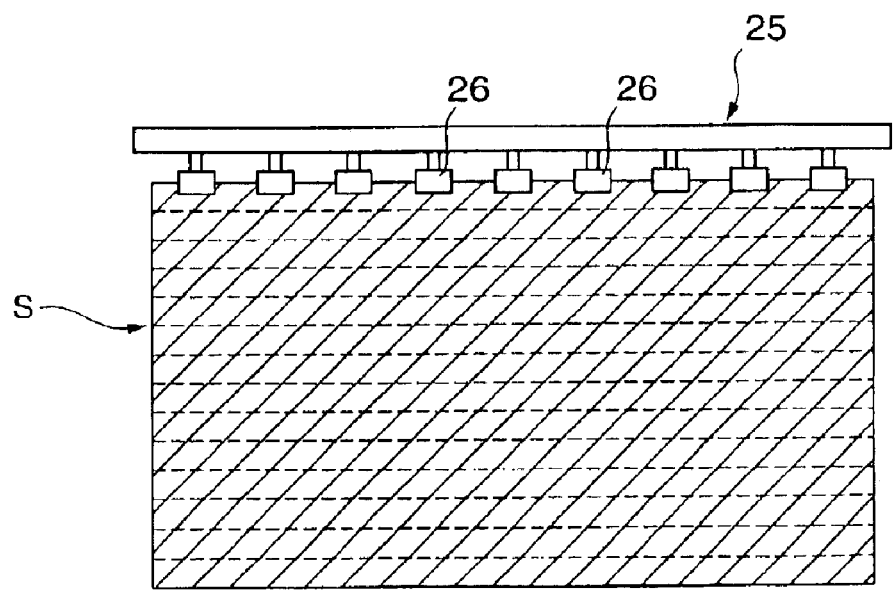
FIG. 11 is a side elevation of a prepreg-laminate skin being suspended for carrying in the air.

Then, the automatic cutting machine 10 cuts the large prepreg-laminate $P_1$ in desired dimensions and a desired shape as shown in FIG. 10 to obtain a prepreg-laminate skin S. Then, the hangers 26 of the crane 25 hold one side part of the prepreg-laminate skin S lying on the cutting table 9 with the parting film F held by suction on the cutting table 9 to separate the prepreg-laminate skin S from the parting film F, and the crane 25 suspends the prepreg-laminate skin S like a suspended curtain as shown in FIG. 11.

Figure 12:
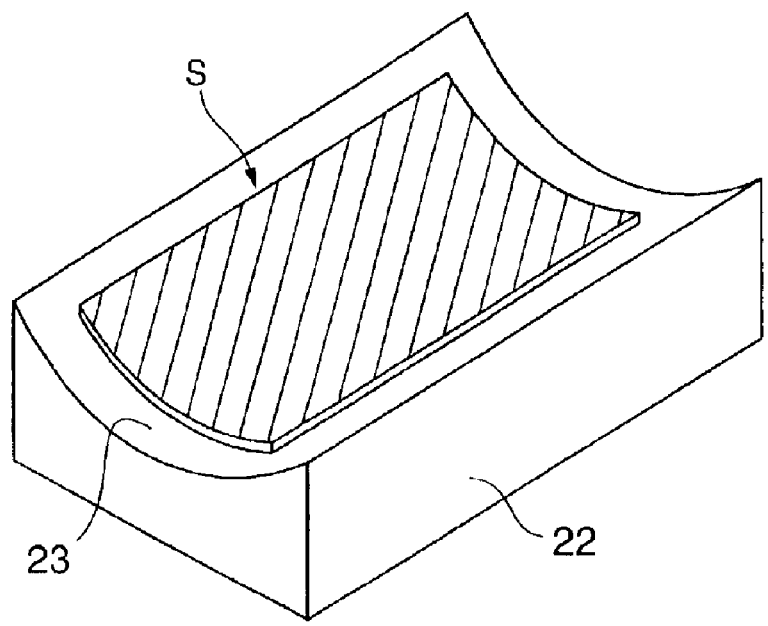
FIG. 12 is a perspective view of a prepreg-laminate laminating mold having a single-contour molding surface and included in the composite panel manufacturing apparatus shown in FIG. 1 with a prepreg-laminate skin mounted thereon.

The crane 25 travels laterally to carry the prepreg-laminate skin S in the air to a position above the prepreg-laminate laminating mold 22 and lays the prepreg-laminate skin S on the single-contour molding surface 23 of the prepreg-laminate laminating mold 22 as shown in FIG. 12.

Subsequently, air is jetted through the small holes 2 of the flat laminating table 12 to float up the gridlike prepreg-laminate (narrow prepreg-laminate) $P_2$ together with the parting film F. The grippers 31 mounted on the carriages 30' of the sliding carrying machine 27' shown in FIGS. 6 and 7 grip the opposite side parts of the parting film F floating over the flat laminating table 12. The carriages 30' then, travel along the rails 28' and 29 to the adjacent prepreg-laminate cutting unit 8 to carry the gridlike prepreg-laminate $P_2$ together with the parting film F in the air and to place the gridlike prepreg-laminate $P_2$ on the cutting table 9 of the prepreg-laminate cutting unit 8.

The grippers 31 release the parting film F, and then air is sucked through the small holes 2 and the air chamber 3 of the cutting table 9 to hold the gridlike prepreg-laminate $P_2$ and the parting film F on the cutting table 9 in close contact with the surface of the cutting table 9.

Figure 13:
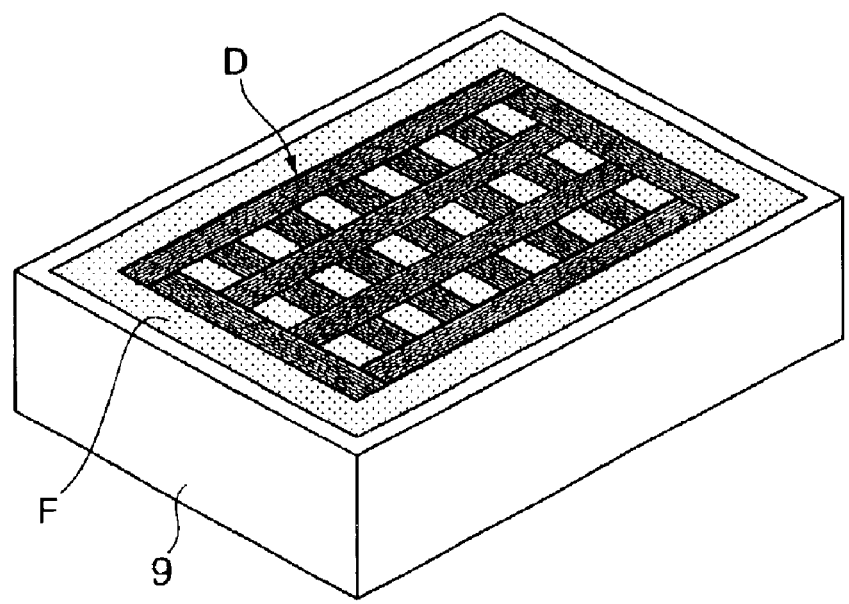
FIG. 13 is a perspective view of a prepreg-laminate doubler obtained by carrying a gridlike prepreg-laminate formed by the narrow-prepreg laminating unit in the air onto the prepreg-laminate cutting unit, and cutting the gridlike prepreg-laminate.

Then, the automatic cutting machine 10 cuts the gridlike prepreg-laminate $P_2$ in desired dimensions and a desired shape as shown in FIG. 13 to obtain a prepreg-laminate doubler D, which is used as a reinforcement for reinforcing a part to which stringers or the like of a fuselage panel are attached.

Figure 14:
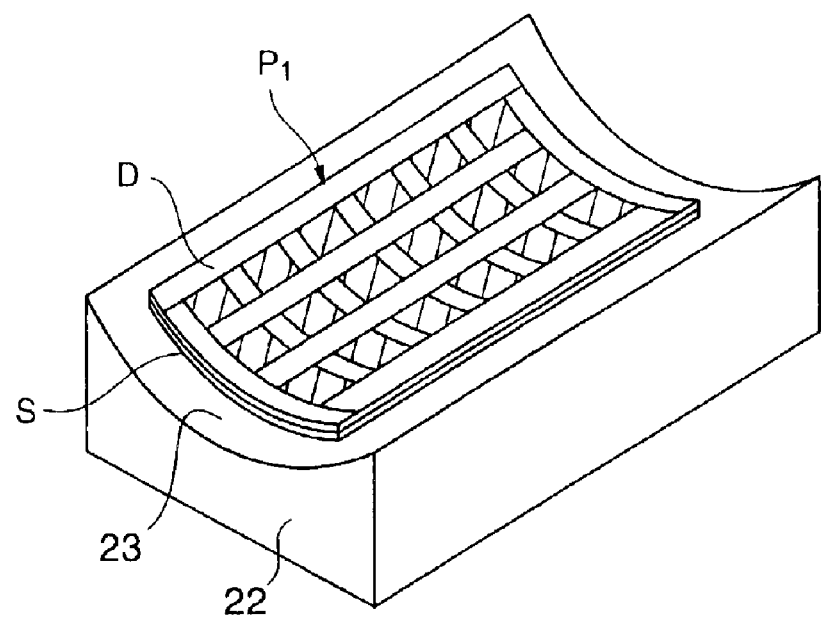
FIG. 14 is a perspective view of a single-contour composite panel formed by laminating the prepreg-laminate skin shown in FIG. 12 and the prepreg-laminate doubler shown in FIG. 13.

Then, after floating up the prepreg-laminate doubler D together with the parting film F by jetting air through the small holes 2 of the cutting table 9. The hangers 26 of the crane 25 hold one side part of the parting film F and the crane 25 suspends the parting film F like a suspended curtain as shown in FIG. 11. Then, the crane 25 travels laterally to carry the prepreg-laminate doubler D in the air to a position above the prepreg-laminate laminating mold 22 and lays the prepreg-laminate doubler D with the parting film F facing up on the prepreg-laminate skin S previously laid on the single-contour molding surface 23 of the prepreg-laminate laminating mold 22. Then, the parting film F is removed from the prepreg-laminate doubler D and the prepreg-laminate skin S and the prepreg-laminate doubler D are laminated to form a single-contour composite panel P1 as shown in FIG. 14.

A composite panel manufacturing method embodying the present invention of manufacturing a double-contour composite panel, such as a wing panel or a fuselage panel, does not use the scattered-prepreg laminating unit 17 of the composite panel manufacturing apparatus, but uses a prepreg-laminate laminating mold 22 having a double-contour molding surface 24 as shown in FIG. 5. The steps of this composite panel manufacturing method will be described.

Figure 15:
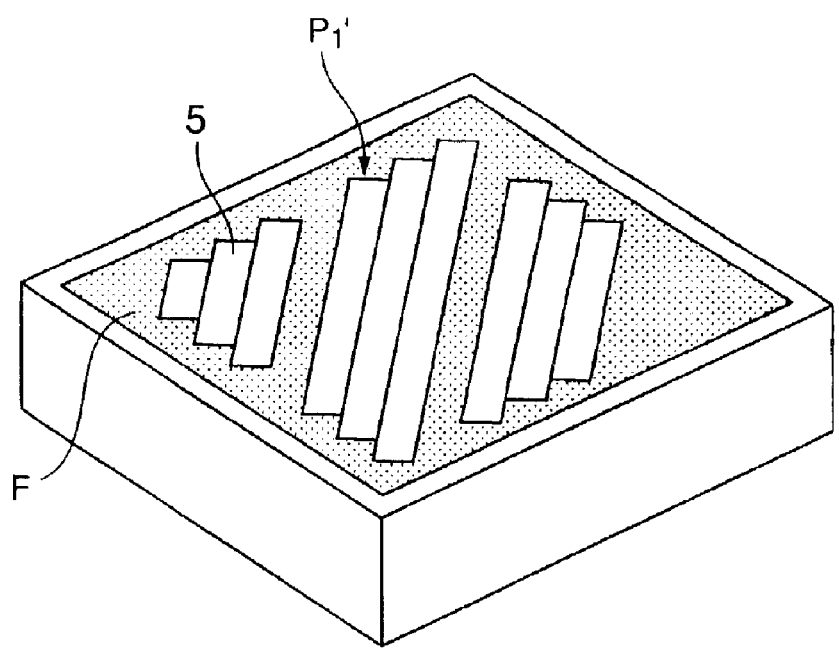
FIG. 15 is a perspective view of a large gapped prepreg-laminate formed by the wide-prepreg laminating unit of the composite panel manufacturing apparatus shown in FIG. 1.

Referring to FIG. 2, a parting film F is spread on the flat laminating table 4 of the wide-prepreg laminating unit 1, air is sucked through the small holes 2 opening in the upper surface of the flat laminating table 4 and through the air chamber 3 extending under the small holes 2 to hold the parting film F in close contact with the flat laminating table 4 by suction. Then, the laminating head 6 of the four-axis automatic laminating machine 7 lays unidirectional and bidirectional wide prepregs 5 of 1 m in width for plane lamination on the parting film F to form a large gapped prepreg-laminate $P_1'$ having a large area as shown in FIG. 15.

In the meantime, the narrow-prepreg laminating unit 11 performs the steps performed by the narrow-prepreg laminating unit 11 in carrying out the foregoing composite panel manufacturing method to form a gridlike laminate $P_2$ as shown in FIG. 3.

Then, air is jetted through the small holes 2 of the flat laminating table 4 to float up the large gapped prepreg-laminate $P_1'$ together with the parting film F. The grippers 31 mounted on the carriages 30 of the sliding carrying machine 27 shown in FIGS. 6 and 7 grip the opposite side parts of the parting film F floating over the flat laminating table 4, the carriages 30 travel along the rails 28 and 29 to the adjacent prepreg-laminate cutting unit 8 to carry the large gapped prepreg-laminate $P_1'$ together with the parting film F in the air and to place the large gapped prepreg-laminate $P_1'$ on the cutting table 9 of the prepreg-laminate cutting unit 8. The grippers 31 release the parting film F, and then air is sucked through the small holes 2 and the air chamber 3 of the cutting table 9 to hold the large gapped prepreg-laminate $P_1'$ and the parting film F on the cutting table 9 in close contact with the surface of the cutting table 9.

Figure 16:
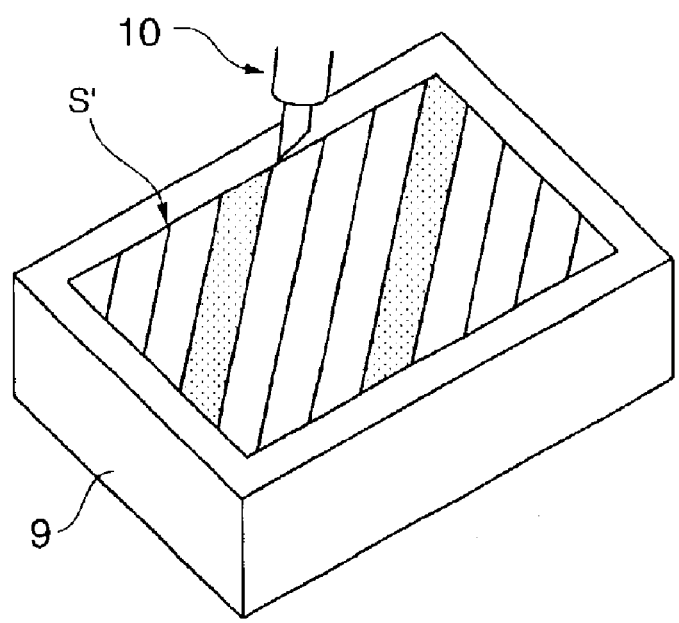
FIG. 16 is a perspective view of a gapped prepreg-laminate skin obtained by cutting the large gapped prepreg-laminate shown in FIG. 15 by the prepreg-laminate cutting unit.
Figure 17:
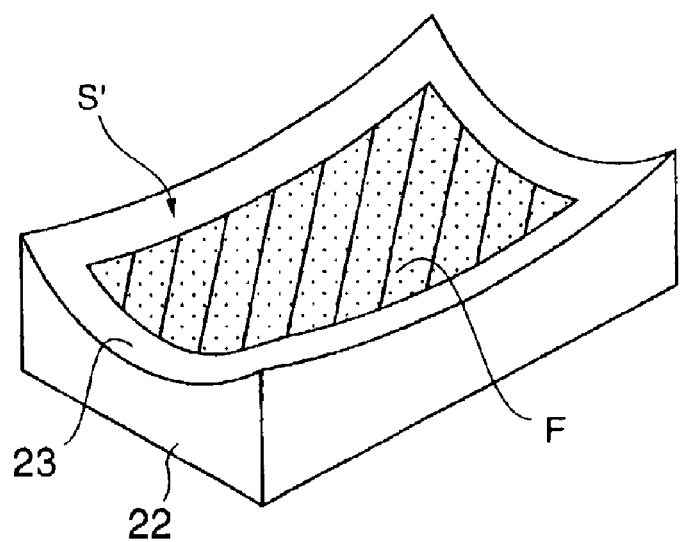
FIG. 17 is a perspective view of a prepreg-laminate laminating mold having a double-contour molding surface with a gapped prepreg-laminate skin laid thereon.

Then, the automatic cutting machine 10 cuts the large gapped prepreg-laminate $P_1'$ in desired dimensions and a desired shape as shown in FIG. 16 to obtain a gapped prepreg-laminate skin S'. After floating up the gapped prepreg-laminate skin S' together with the parting film F by jetting air through the small holes 102 of the cutting table 9, the hangers 26 of the crane 25 hold one side part of the parting film F and the crane 25 suspends the gapped prepreg-laminate skin S' like a suspended curtain as mentioned in connection with FIG. 11. The crane 25 travels laterally to carry the gapped prepreg-laminate skin S' in the air to a position above the prepreg-laminate laminating mold 22 and lays the gapped prepreg-laminate skin S' on the double-contour molding surface 24 of the prepreg-laminate laminating mold 22 as shown in FIG. 17.

Figure 18:
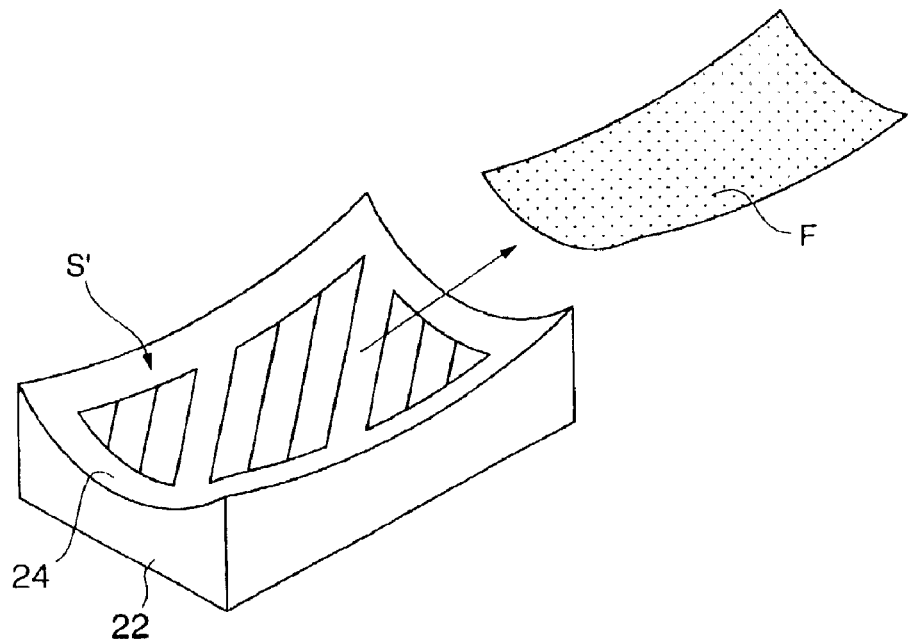
FIG. 18 is a perspective view of assistance in explaining forming the gapped prepreg-laminate skin shown in FIG. 17 in a shape conforming to the double-contour molding surface.

Then, the parting film F is separated from the gapped prepreg-laminate skin S' as shown in FIG. 18, and the gapped prepreg-laminate skin S' is shaped so as to conform to the double-contour molding surface 24.

Figure 19:
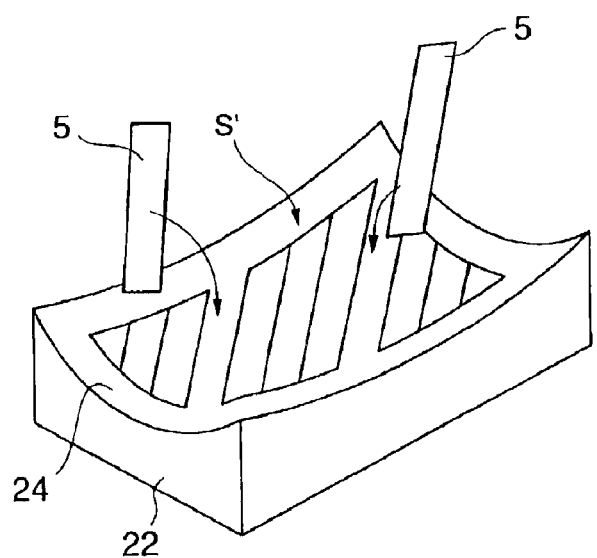
FIG. 19 is a perspective view of assistance in explaining additionally laying wide prepregs in gaps in the gapped prepreg-laminate skin shown in FIG. 18.
Figure 20:
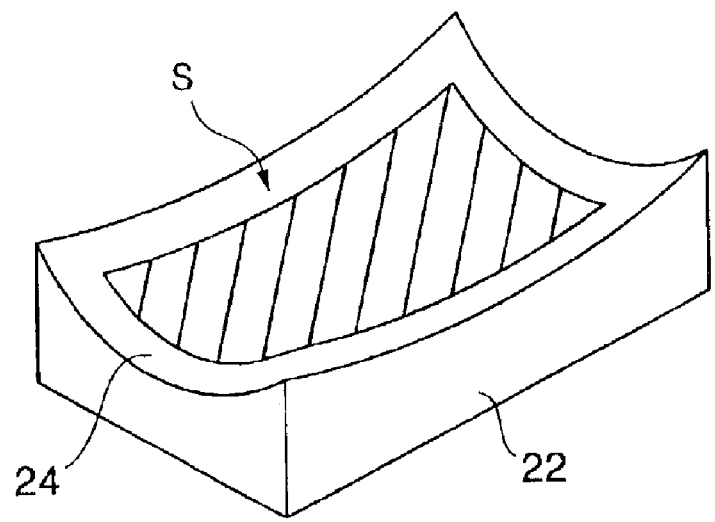
FIG. 20 is a perspective view of a gapless prepreg-laminate skin formed by additionally laying the wide prepregs in gaps in the gapped prepreg-laminate skin as explained with reference to FIG. 19.

Subsequently, wide prepregs 5 are laid manually in gaps in the gapped prepreg-laminate skin S' as shown in FIG. 19 to obtain a gapless prepreg-laminate skin S as shown in FIG. 20.

In the meantime, the gridlike prepreg-laminate $P_2$ is carried in the air to the prepreg-laminate cutting unit 8 and is placed on the cutting table 9 by the foregoing carrying operations. Then, the automatic cutting machine 10 cuts the gridlike prepreg-laminate $P_2$ in desired dimensions and a desired shape to obtain a prepreg-laminate doubler D, which is used as a reinforcement for reinforcing a part to which stringers or the like of a fuselage panel or a wing panel are attached, as shown in FIG. 13. Then, the prepreg-laminate doubler D is carried in the air to a position above the prepreg-laminate laminating mold 22 and is laid with the parting film F facing up on the gapless prepreg-laminate skin S previously laid on the double-contour molding surface 24 of the prepreg-laminate laminating mold 22 by the foregoing operations.

Figure 21:
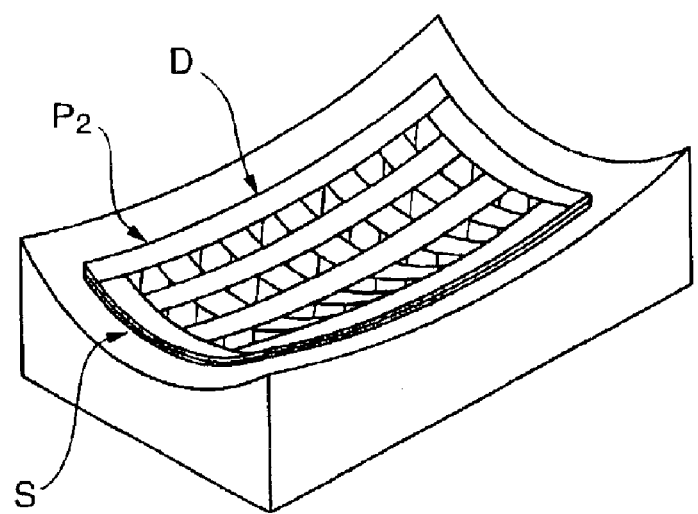
FIG. 21 is a perspective view of a composite panel formed in the shape of the double-contour molding surface by laminating the gapless prepreg-laminate skin shown in FIG. 20 and a prepreg-laminate doubler.

Then, the parting film F is removed from the prepreg-laminate doubler D and the gapless prepreg-laminate skin S and the prepreg-laminate doubler D are laminated to form a double-contour composite panel P2 as shown in FIG. 21 for use as a wing panel or a fuselage panel.

A composite panel manufacturing method embodying the present invention of manufacturing a single-contour composite panel for use as a fuselage panel provided with openings for windows or the like, uses the scattered-prepreg laminating unit 17 provided with the automatic laminating machine 21 as shown in FIG. 4, and a prepreg-laminate laminating mold 22 having a single-contour molding surface 23. Steps of this composite panel manufacturing method will be described.

The wide-prepreg laminating unit 1 and the narrow-prepreg laminating unit 11 carry out steps of the foregoing composite panel manufacturing method of forming the single-contour composite panel to form a large prepreg-laminate $P_1$ and a gridlike prepreg-laminate $P_2$ simultaneously.

Figure 22:
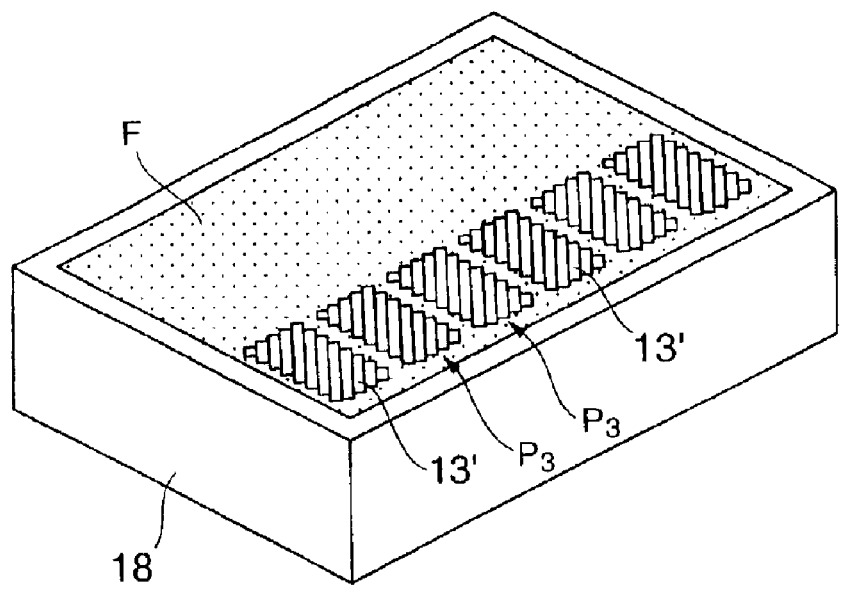
FIG. 22 is a perspective view of scattered prepreg-laminates formed by the scattered-prepreg laminating unit shown in FIG. 4.

In the meantime as shown in FIG. 22, a parting film F is spread on the flat laminating table 18 of the scattered-prepreg laminating unit 17, and air is sucked through the small holes 2 opening in the upper surface of the flat laminating table 18 to hold the parting film F in close contact with the flat laminating table 18. Then, the four-axis laminating head 20 of the automatic laminating machine 21 lays unidirectional or bidirectional narrow prepregs 13' of a width in the range of 10 to 20 mm at desired positions for plane lamination to form scattered prepreg-laminates $P_3$.

Then, the large prepreg-laminate $P_1$ and the gridlike prepreg-laminate $P_2$ are cut successively by the prepreg-laminate cutting unit 8 in desired dimensions and desired shapes, respectively, by the same steps as those previously mentioned in the description of the foregoing composite panel manufacturing method of forming the double-contour composite panel to obtain a prepreg-laminate skin S and a prepreg-laminate doubler D.

The prepreg-laminate skin S and the prepreg-laminate doubler D are laminated on the single-contour molding surface 23 of the prepreg-laminate laminating mold 22.

Figure 23:
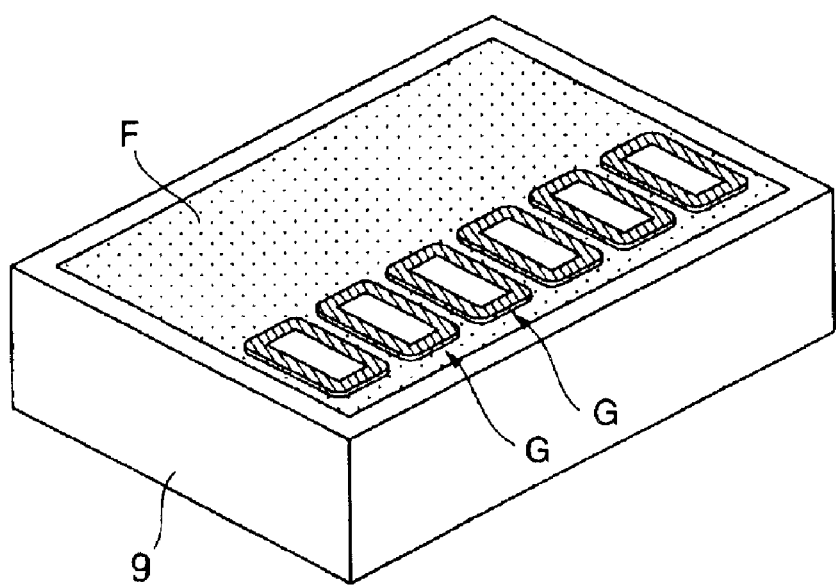
FIG. 23 is a perspective view of prepreg-laminate local reinforcements obtained by cutting the scattered prepreg-laminates shown in FIG. 22 by the prepreg-laminate cutting unit.
Figure 24:
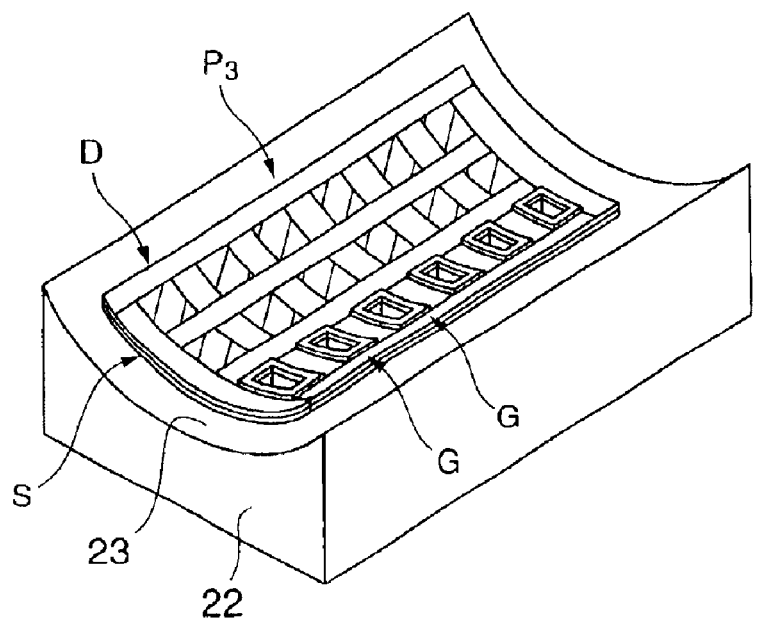
FIG. 24 is perspective view of a composite panel formed in the shape of the single-contour molding surface by laminating the prepreg-laminate local reinforcements shown in FIG. 23, the prepreg-laminate skin and the prepreg-laminate doubler on a prepreg-laminate laminating mold having a single-contour molding surface.

Then, the scattered prepreg-laminates $P_3$ are floated up together with the parting film F by jetting air through the small holes 2 of the flat laminating table 18, and the scattered prepreg-laminates $P_3$ are carried manually in the air onto the cutting table 9 of the prepreg-laminate cutting unit 8. Air is sucked through the small holes 2 of the cutting table 9 to hold the scattered prepreg-laminates $P_3$ and the parting film F on the cutting table 9 by suction in close contact with the cutting table 9. Subsequently, the automatic cutting machine 10 cuts the scattered prepreg-laminates $P_3$ in desired dimensions and a desired shape to obtain prepreg-laminate local reinforcements G as shown in FIG. 23 to be used for reinforcing parts, around openings for windows or the like, of a fuselage panel.

Then, after floating up the prepreg-laminate local reinforcements G together with the parting film F by jetting air through the small holes 2 of the cutting table 9, the hangers 26 of the crane 25 hold one side part of the parting film F and the crane 25 suspends the parting film F like a suspended curtain. Then, the crane 25 carries the prepreg-laminate local reinforcements G in the air, lays the prepreg-laminate local reinforcements G with the parting film F facing up on a laminate of the prepreg-laminate skin S and the prepreg-laminate doubler D previously formed on the single-contour molding surface 23 of the prepreg-laminate laminating mold 22 and separates the parting film F from the prepreg-laminate local reinforcements G. Thus, a single-contour composite panel P3 to be used as a fuselage panel provided with openings for windows or the like is formed.

A composite panel manufacturing method embodying the present invention of manufacturing a double-contour composite panel for use as a wing panel provided with reinforced mounting parts, uses the scattered-prepreg laminating unit 17 provided with the prepreg-laying position detecting template 19, and a prepreg-laminate laminating mold 22 having a double-contour molding surface 23. Steps of this composite panel manufacturing method will be described.

The wide-prepreg laminating unit 1 and the narrow-prepreg laminating unit 11 carry out steps of the foregoing composite panel manufacturing method of forming the double-contour composite panel to form a large gapped prepreg-laminate $P_1$' and a gridlike prepreg-laminate $P_2$ simultaneously.

Figure 25:
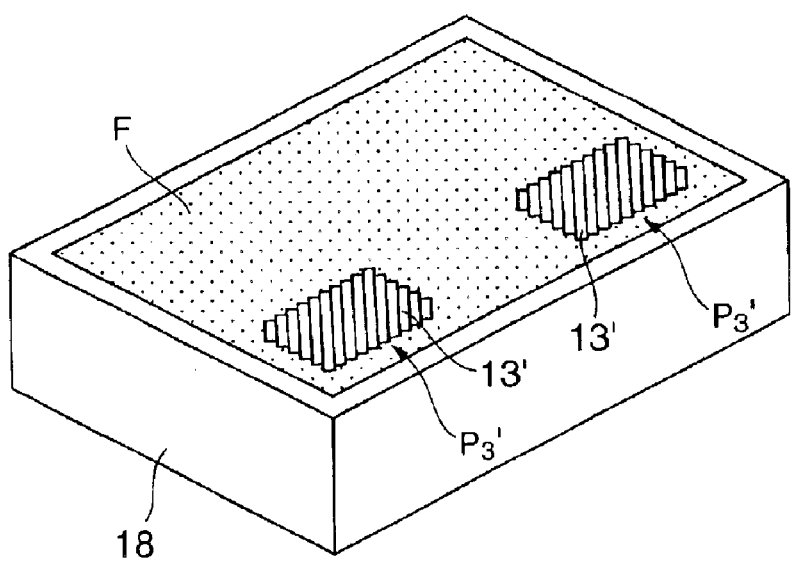
FIG. 25 is a perspective view of a scattered prepreg-laminates formed by the scattered-prepreg laminating unit of the automatic prepreg laminating apparatus shown in FIG. 1.

In the meantime, the scattered-prepreg laminating unit 17 forms a scattered prepreg laminates $P_3$'. As shown in FIG. 22, a parting film F is spread on the flat laminating table 18 of the scattered-prepreg laminating unit 17, and air is sucked through the small holes 2 opening in the upper surface of the flat laminating table 18 to hold the parting film F in close contact with the flat laminating table 18. Then, unidirectional or bidirectional narrow prepregs 13' of a width in the range of 10 to 20 mm are laid manually for lamination at desired positions determined by the prepreg-laying position detecting template 19 shown in FIGS. 1 to 3 to form scattered prepreg-laminates $P_3$' shown in FIG. 25.

Then, the large gapped prepreg-laminate $P_1$' and the gridlike prepreg-laminate $P_2$ are cut successively by the prepreg-laminate cutting unit 8 in desired dimensions and desired shapes, respectively, by the same steps as those previously mentioned in the description of the foregoing composite panel manufacturing method of forming the double-contour composite panel to obtain a gapped prepreg-laminate skin S' and a prepreg-laminate doubler D.

The gapped prepreg-laminate skin S' is carried in the air and is laid on the double-contour laminating surface 24 of the prepreg-laminate laminating mold 22 as shown in FIG. 17 by the same steps as those mentioned in the description of the foregoing composite panel manufacturing method. Then, the parting film F is separated from the gapped prepreg-laminate skin S' as shown in FIG. 18 and gapped prepreg-laminate skin S' is shaped so as to conform to the double-contour molding surface 24.

Subsequently, wide prepregs 5 are laid manually for lamination in gaps in the gapped prepreg-laminate skin S' as shown in FIG. 19 to obtain a gapless prepreg-laminate skin S as shown in FIG. 20. Then, the prepreg-laminate doubler D is carried in the air to the prepreg-laminate laminating mold 22, is laid with the parting film F facing up on and is laminated to the gapless prepreg-laminate skin S previously laid on the double-contour molding surface 24 of the prepreg-laminate laminating mold 22 by the foregoing steps, and the parting film F is removed.

Figure 26:
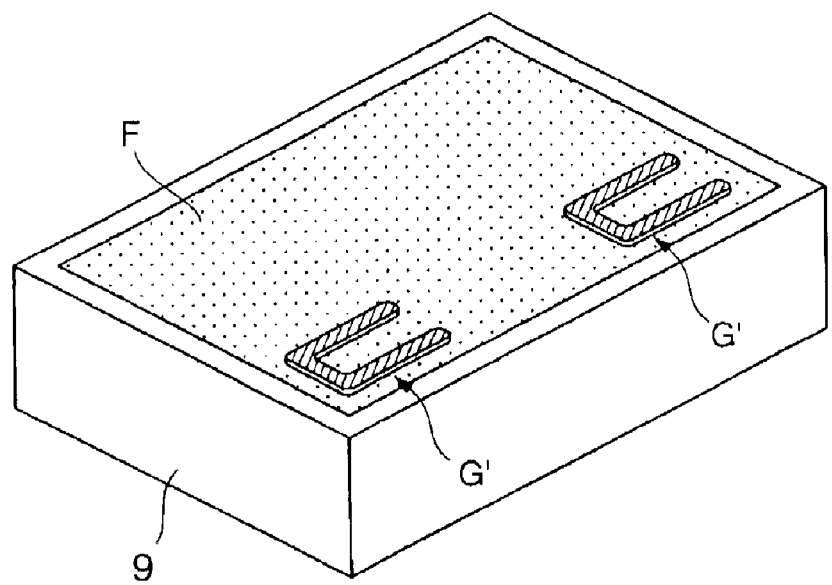
FIG. 26 is a perspective view of prepreg-laminate local reinforcements obtained by cutting the scattered prepreg-laminates shown in FIG. 25 by the prepreg-laminate cutting unit.
Figure 27:
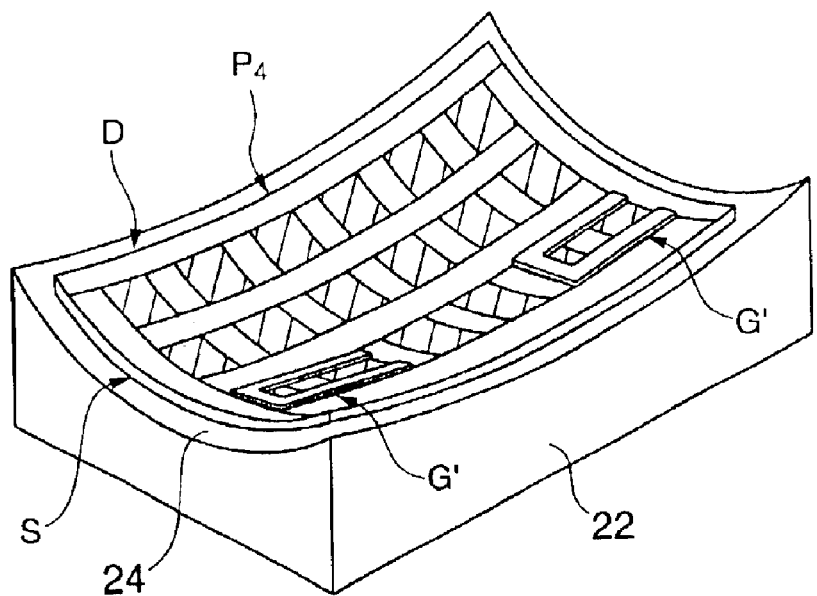
FIG. 27 is a perspective view of a composite panel formed in the shape of the double-contour molding surface by laminating the prepreg-laminate skin, the prepreg-laminate doubler and the prepreg-laminate local reinforcements shown in FIG. 26 on a prepreg-laminate laminating mold having a double-contour molding surface.

Then, the scattered prepreg-laminates $P_3$' are carried in the air to and is laid with the parting film F touching the cutting table 9. Air is sucked through the small holes 2 of the cutting table 9 to hold the scattered prepreg-laminates $P_3$' and the parting film F on the cutting table 9 by suction in close contact with the cutting table 9. Subsequently, the automatic cutting machine 10 cuts the scattered prepreg-laminates P₃' in desired dimensions and a desired shape to obtain prepreg-laminate local reinforcements G' as shown in FIG. 26 to be used for reinforcing mounting parts of a wing panel.

Then, the prepreg-laminate local reinforcements G' are carried in the air, are laid with the parting film F facing up on a laminate previously formed on the double-contour molding surface 24 of the prepreg-laminate laminating mold 22 by laminating the gapless prepreg-laminate skin S and the prepreg-laminate doubler D, and the parting film F is separated from the prepreg-laminate local reinforcements G' by the same steps as those mentioned in the description of the foregoing composite panel manufacturing method. Thus, a double-contour composite panel P4 to be used as a wing panel having mounting parts is formed.

As apparent from the foregoing description, according to the present invention, the composite panel manufacturing methods of manufacturing composite panels for aircraft perform the prepreg-laminate skin forming step, the prepreg-laminate doubler forming step and the prepreg-laminate local reinforcement forming step separately. Therefore, the component structures of the composite panels can simply and quickly be laminated. Since the prepreg-laminates are cut separately to provide prepreg-laminate structures, the prepreg-laminate structures can accurately and precisely be formed in desired dimensions and desired shapes, respectively. Since a desired composite panel is formed by laminating the cut prepreg-laminate structures, the composite panel can efficiently be formed in a very high accuracy. Since the prepreg-laminate is carried in the air from the prepreg-laminate forming unit to a prepreg-laminate cutting unit, and from the prepreg-laminate cutting unit to the prepreg-laminate laminating unit, the prepreg-laminates can safely and quickly be carried without being deformed or damaged. Thus, the processes are able to cooperate smoothly to manufacture a composite panel through quick lamination.

The composite panel manufacturing apparatus according to the present invention is capable of easily, efficiently and surely carrying out the excellent composite panel manufacturing method according to the present invention.

Since the composite panel manufacturing apparatus includes the prepreg laminating units, the prepreg-laminate cutting unit, the prepreg-laminate laminating molds and the carrying machines, which are constructed individually, and is simple in construction, lightweight and inexpensive, the composite panel manufacturing apparatus of the present invention is able to manufacture composite panels at a production rate higher than that at which the conventional large-scale all-in-one automatic laminating apparatus manufactures composite panels, and all the component units and machines of the composite panel manufacturing apparatus of the present invention can continuously be used without being kept unused to manufacture composite panels at a high production rate.

Second Embodiment

A second embodiment according to the present invention will be described with reference to the accompanying drawings.

A high-speed prepreg laminating apparatus for carrying out a high-speed prepreg laminating method embodying the present invention will be described with reference to FIGS. 28 and 29.

A wide-prepreg laminating unit 101 includes a flat laminating table (first flat laminating table) 104 of 10 m in width and 15 m in length provided with a plurality of small holes 102 opening in its upper surface for sucking and jetting air, and defining an air chamber 103 in its lower part; and an automatic laminating machine 107 provided with a four-axis laminating head 106 held above the flat laminating table 104 to lay unidirectional and/or bidirectional wide prepregs 105 of a width greater than 1 m for plane lamination on the flat laminating table 104.

A prepreg-laminate cutting unit 108 adjoining the wide-prepreg laminating unit 101 includes a cutting table 109 of 10 m in width and 15 m in length provided with a plurality of small holes 102 opening in its upper surface for sucking and jetting air, and defining an air chamber 103 in its lower part; and an automatic cutting machine 110 held above the cutting table 109.

A narrow-prepreg laminating unit 111 adjoining the prepreg-laminate cutting unit 108 includes a flat laminating table (second flat laminating table) 112 of 10 m in width and 15 m in length provided with a plurality of small holes 102 opening in its upper surface for sucking and jetting air, and defining an air chamber 103 in its lower part; and an automatic laminating machine 115 provided with a four-axis laminating head 114 held above the flat laminating table 112 to lay unidirectional and/or bidirectional narrow prepreg tapes 113 of a width in the range of 1 to 20 cm longitudinally and laterally, or diagonally at intervals in a grid for plane lamination on the flat laminating table 112.

Figure 30:
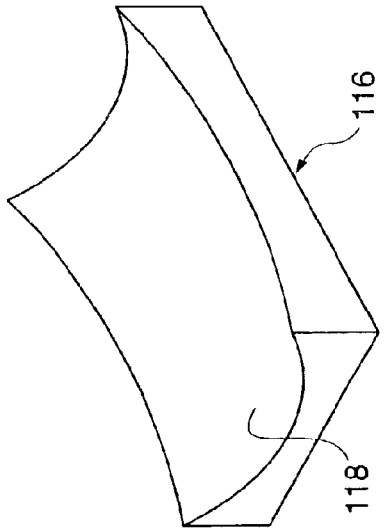
FIG. 30 is a perspective view of another prepreg-laminate laminating mold for the high-speed prepreg laminating apparatus shown in FIG. 28.

A prepreg-laminate laminating mold 116 is disposed so as to adjoin the prepreg-laminate cutting unit 108 on one side of the longitudinal arrangement of the wide-prepreg laminating unit 101, the prepreg-laminate cutting unit 108 and the narrow-prepreg laminating unit 111. The prepreg-laminate laminating mold 116 of the high-speed prepreg laminating apparatus has a single-contour molding surface 117 as shown in FIG. 28, or a prepreg-laminate laminating mold 116 having a double-contour molding surface 118 can be used as shown in FIG. 30.

Figure 28:
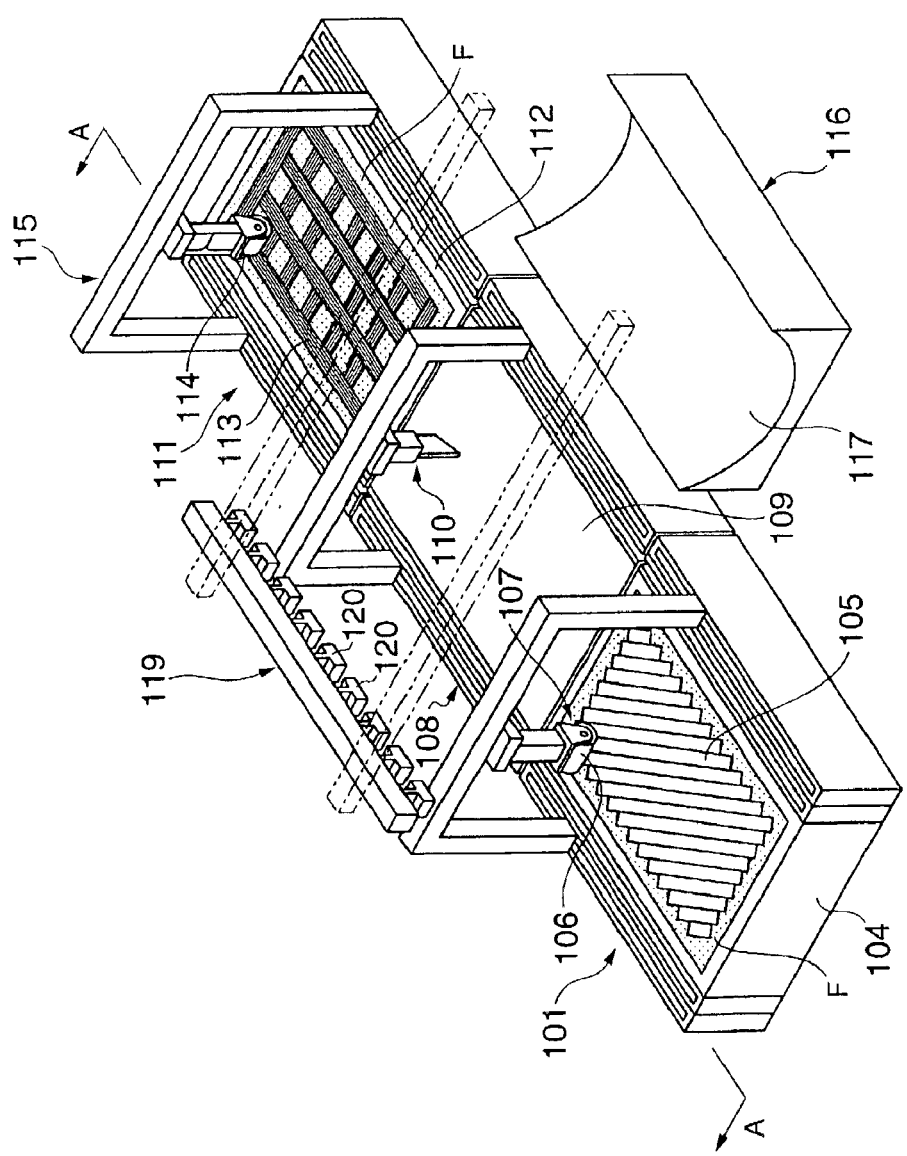
FIG. 28 is a schematic perspective view of a high-speed prepreg laminating apparatus in a second embodiment according to the present invention.
Figure 29:
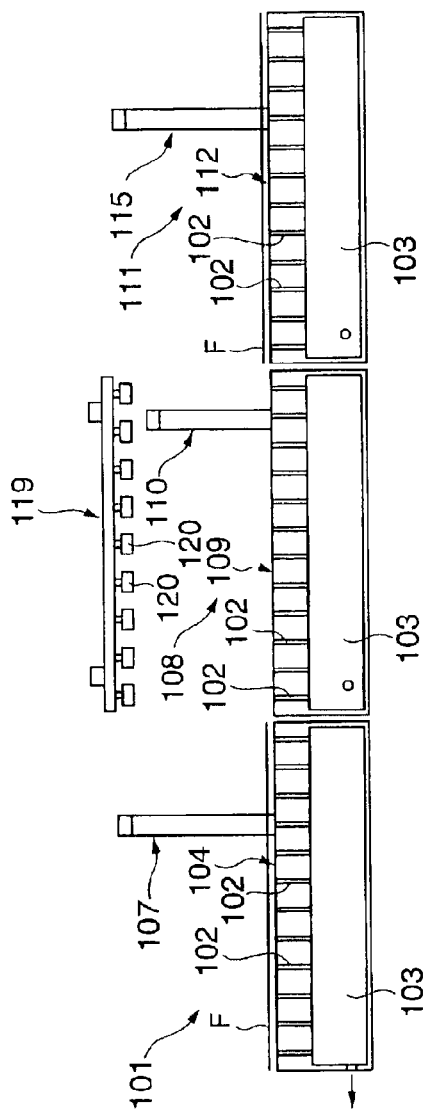
FIG. 29 is a view taken in the direction of the arrows along the line A—A in FIG. 28.

As shown in FIGS. 28 and 29, a crane 119 is provided with hangers 120 for suspending a cut prepreg-laminate cut by the prepreg-laminate cutting unit 108 like a suspended curtain. The crane 119 moves between the prepreg-laminate cutting unit 108 and the prepreg-laminate laminating mold 116 to carry a cut prepreg-laminate in the air from the prepreg-laminate cutting unit 108 to the prepreg-laminate laminating mold 116.

A sliding carrying machine 121 carries a prepreg-laminate from the wide-prepreg laminating unit 101 to the prepreg-laminate cutting unit 8. A sliding carrying machine 121' carries a prepreg-laminate from the narrow-prepreg laminating unit 111 to the prepreg-laminate cutting unit 108.

Figure 31:
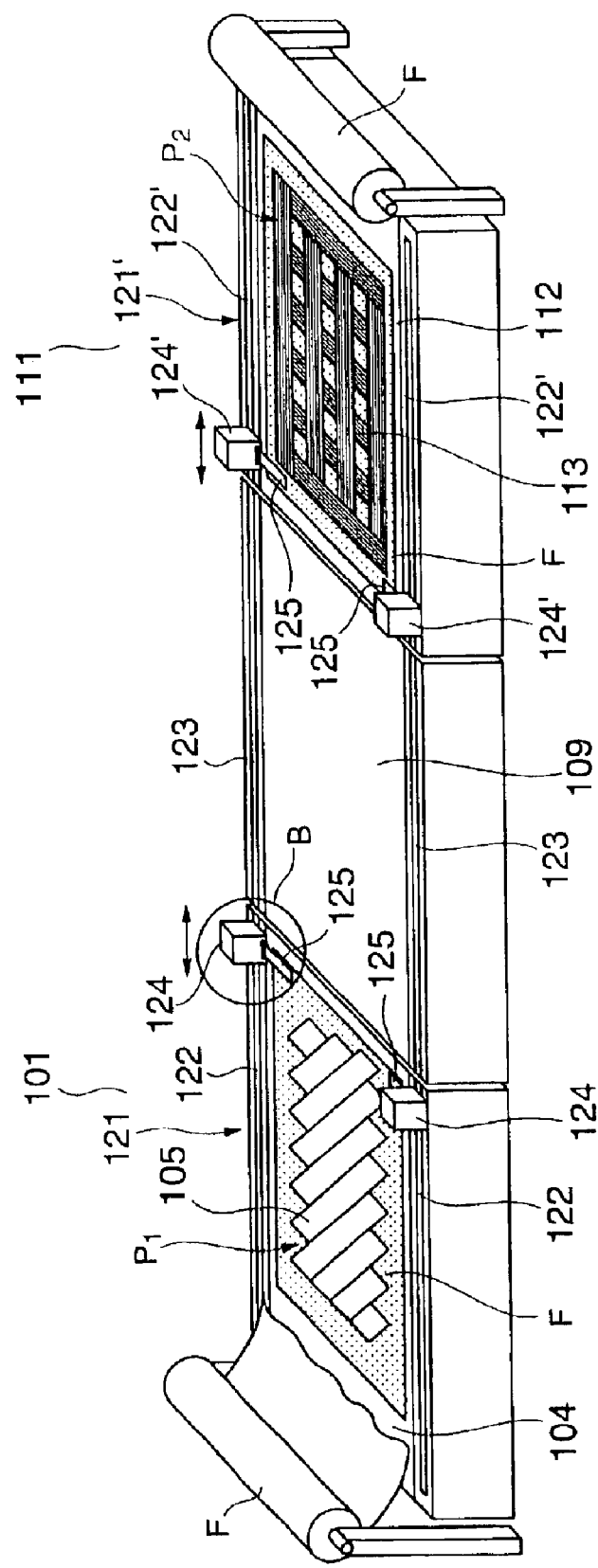
FIG. 31 is a schematic perspective view of a sliding carrying machine capable of moving between a wide-prepreg laminating unit and a prepreg-laminate cutting unit and between a narrow-prepreg laminating unit and the prepreg-laminate cutting unit and of carrying a prepreg-laminate in the air in the high-speed prepreg laminating apparatus shown in FIG. 28.
Figure 32:
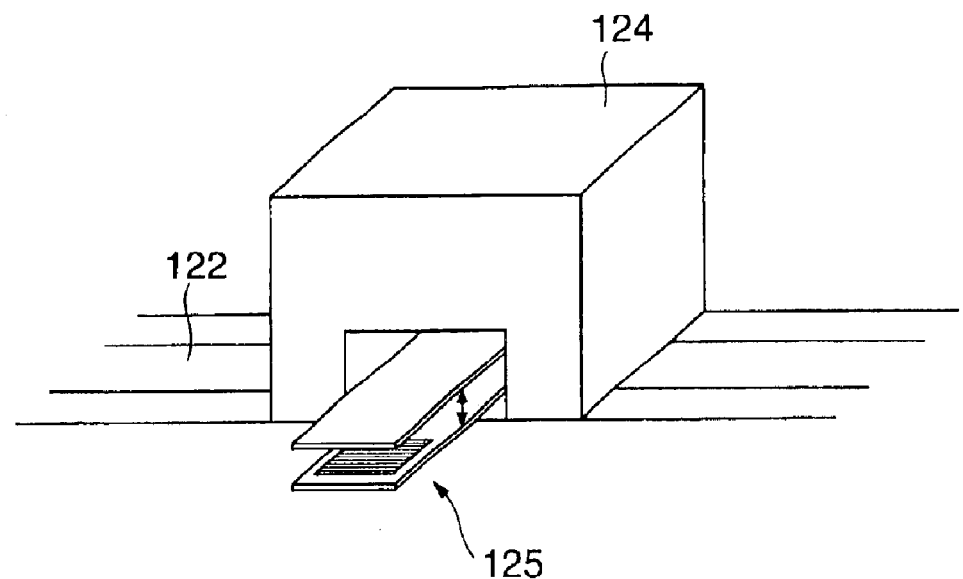
FIG. 32 is an enlarged perspective view of a part B in FIG. 31.

As shown in FIGS. 31 and 32, the sliding carrying machine 121 includes carriages 124 that travel, respectively, along rails 122 extended along the opposite sides of the flat laminating table 104 of the wide-prepreg laminating unit 101 and rails 123 extended along the opposite sides of the cutting table 109 of the prepreg-laminate cutting unit 108, and grippers 125 mounted on the carriages 124 and capable of gripping the opposite side parts of a parting film F spread on the flat laminating table 104, respectively. The sliding carrying machine 121' includes carriages 124' that travel, respectively, along rails 122' extended along the opposite sides of the flat laminating table 112 of the narrow-prepreg laminating unit 111 and the rails 123 extended along the opposite sides of the cutting table 109 of the prepreg-laminate cutting unit 108, and grippers 125 mounted on the carriages 124' and capable of gripping the opposite side parts of a parting film F spread on the flat laminating table 112, respectively.

High-speed prepreg laminating methods embodying the present invention to be carried out by the foregoing high-speed prepreg laminating apparatus will be described.

A high-speed prepreg laminating method of laminating prepregs to manufacture a single-contour prepreg-laminate structure employs the prepreg-laminate laminating mold 116 having the single-contour molding surface 117 as shown in FIG. 28. The steps of the high-speed prepreg laminating method will be described.

Referring to FIG. 29, a parting film F is spread on the flat laminating table 104 of the wide-prepreg laminating unit 101, air is sucked through the small holes 102 opening in the upper surface of the flat laminating table 104 and through the air chamber 103 extending under the small holes 102 to hold the parting film F in close contact with the flat laminating table 104 by suction. Then, as shown in FIG. 28, the laminating head 106 of the four-axis automatic laminating machine 107 lays unidirectional and bidirectional wide prepregs 105 of 1 m in width for plane lamination on the parting film F to form a large prepreg-laminate $P_1$ having a large area.

In the meantime, a parting film F is spread on the flat laminating table 112 of the narrow-prepreg laminating unit 111 as shown in FIG. 29, air is sucked through the small holes 102 opening in the upper surface of the flat laminating table 112 and through the air chamber 103 extending under the small holes 102 to hold the parting film F in close contact with the flat laminating table 112 by suction. Then as shown in FIG. 28, the laminating head 114 of the four-axis automatic laminating machine 115 lays unidirectional and bidirectional narrow prepregs 113 of a width in the range of 1 to 20 cm longitudinally and laterally for plane lamination on the parting film F to form a gridlike prepreg-laminate $P_2$.

Then, air is jetted through the small holes 102 of the flat laminating table 104 to float up the large prepreg-laminate $P_1$ together with the parting film F. The grippers 125 mounted on the carriages 124 of the sliding carrying machine 121 shown in FIGS. 31 and 32 grip the opposite side parts of the parting film F floating over the flat laminating table 104. The carriages 124 travel along the rails 122 and 123 to the adjacent prepreg-laminate cutting unit 108 to carry the large prepreg-laminate $P_1$ together with the parting film F in the air and to place the large prepreg-laminate $P_1$ on the cutting table 109 of the prepreg-laminate cutting unit 108. The grippers 125 release the parting film F, and then air is sucked through the small holes 102 and the air chamber 103 of the cutting table 109 to hold the large prepreg-laminate $P_1$ and the parting film F on the cutting table 109 in close contact with the surface of the cutting table 109.

Figure 33:
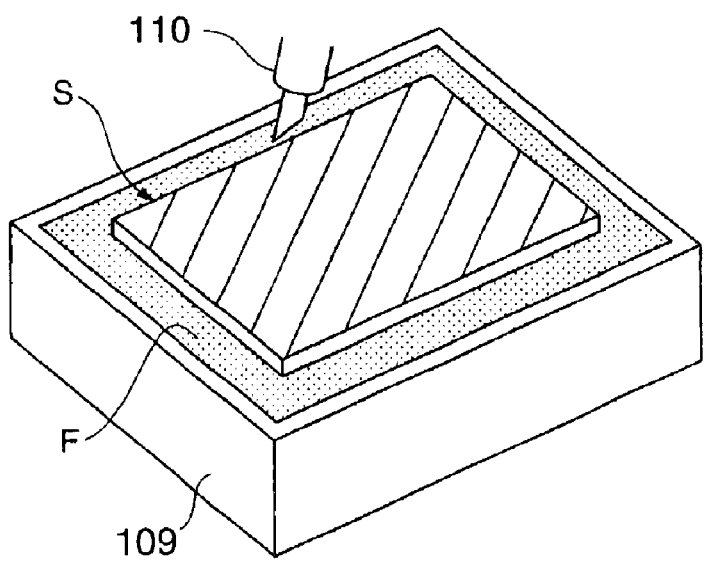
FIG. 33 is a perspective view of a prepreg-laminate skin obtained by cutting a large prepreg-laminate having a large area shown in FIG. 28 by the prepreg-laminate cutting unit.
Figure 34:
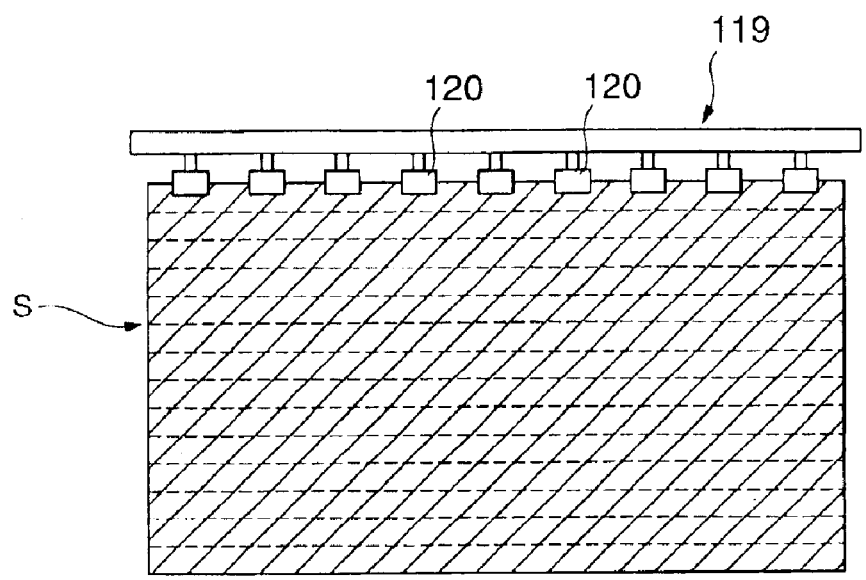
FIG. 34 is a side elevation of the prepreg-laminate skin suspended for carrying in the air.

Then, the automatic cutting machine 110 cuts the large prepreg-laminate $P_1$ in desired dimensions and a desired shape as shown in FIG. 33 to obtain a prepreg-laminate skin S. Then, the hangers 120 of the crane 119 hold one side part of the prepreg-laminate skin S lying on the cutting table 109 with the parting film F held by suction on the cutting table 109 to separate the prepreg-laminate skin S from the parting film F. The crane 119 suspends the prepreg-laminate skin S like a suspended curtain as shown in FIG. 34.

Figure 35:
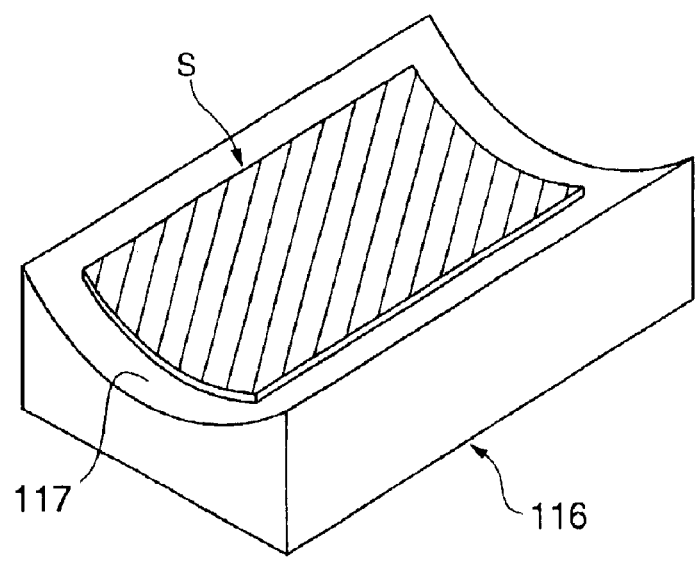
FIG. 35 is a perspective view of a prepreg-laminate skin laid on a prepreg-laminate laminating mold having a single-contour molding surface included in the high-speed prepreg laminating apparatus shown in FIG. 28.

The crane 119 travels laterally to carry the prepreg-laminate skin S in the air to a position above the prepreg-laminate laminating mold 116 and lays the prepreg-laminate skin S on the single-contour molding surface 117 of the prepreg-laminate laminating mold 116 as shown in FIG. 35.

Subsequently, air is jetted through the small holes 102 of the flat laminating table 112 to float up the gridlike prepreg-laminate $P_2$ together with the parting film F.

The grippers 125 mounted on the carriages 124' of the sliding carrying machine 121' shown in FIGS. 31 and 32 grip the opposite side parts of the parting film F floating over the flat laminating table 112. The carriages 124' travel along the rails 122' and 123 to the adjacent prepreg-laminate cutting unit 108 to carry the gridlike prepreg-laminate $P_2$ together with the parting film F in the air and to place the gridlike prepreg-laminate $P_2$ on the cutting table 109 of the prepreg-laminate cutting unit 108. The grippers 125 release the parting film F, and then air is sucked through the small holes 102 and the air chamber 103 of the cutting table 109 to hold the gridlike prepreg-laminate $P_2$ and the parting film F on the cutting table 109 in close contact with the surface of the cutting table 109.

Figure 36:
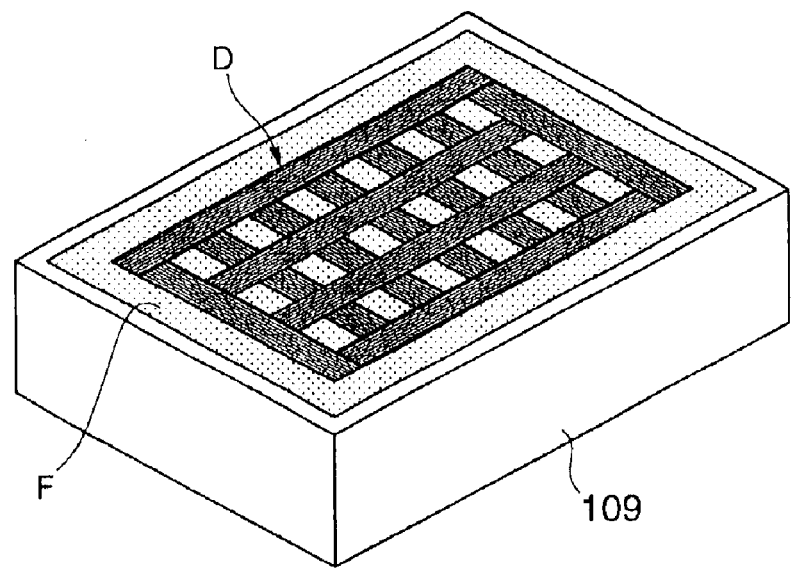
FIG. 36 is a perspective view of a prepreg-laminate doubler obtained by carrying a gridlike prepreg-laminate formed by a narrow-prepreg laminating unit included in the high-speed prepreg laminating apparatus shown in FIG. 28 in the air to the prepreg-laminate cutting unit and cutting the gridlike prepreg-laminate by the prepreg-laminate cutting unit.

Then, the automatic cutting machine 110 cuts the gridlike prepreg-laminate $P_2$ in desired dimensions and a desired shape as shown in FIG. 36 to obtain a prepreg-laminate doubler D.

After floating up the prepreg-laminate doubler D together with the parting film F by jetting air through the small holes 102 of the cutting table 109, the hangers 120 of the crane 119 hold one side part of the parting film F. The crane 119 suspends the parting film F like a suspended curtain as shown in FIG. 34.

Then, the crane 119 travels laterally to carry the prepreg-laminate doubler D in the air to a position above the prepreg-laminate laminating mold 116 and lays the prepreg-laminate doubler D with the parting film F facing up on the prepreg-laminate skin S previously laid on the single-contour molding surface 117 of the prepreg-laminate laminating mold 116.

Figure 37:
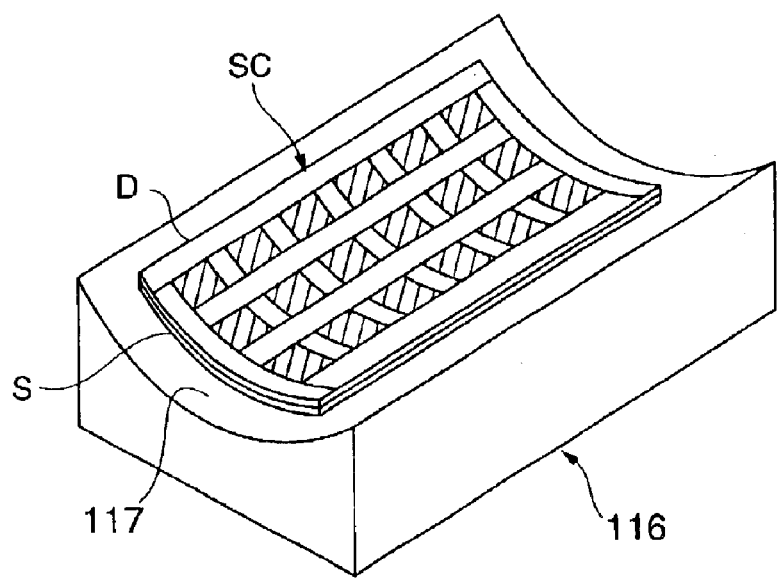
FIG. 37 is a perspective view of a composite panel formed in the shape of a single-contour molding surface by laminating the prepreg-laminate skin shown in FIG. 35 and the prepreg-laminate doubler shown in FIG. 36.

Then, the parting film F is removed from the prepreg-laminate doubler D and the prepreg-laminate skin S and the prepreg-laminate doubler D are laminated to form a single-contour composite panel SC as shown in FIG. 37.

A high-speed prepreg laminating method embodying the present invention of manufacturing a double-contour composite panel uses the prepreg-laminate laminating mold 116 having the double-contour molding surface 118 as shown in FIG. 30. The steps of this high-speed prepreg laminating method will be described.

Referring to FIG. 29, a parting film F is spread on the flat laminating table 104 of the wide-prepreg laminating unit 101, air is sucked through the small holes 102 opening in the upper surface of the flat laminating table 104 to hold the parting film F in close contact with the flat laminating table 104 by suction.

Figure 38:
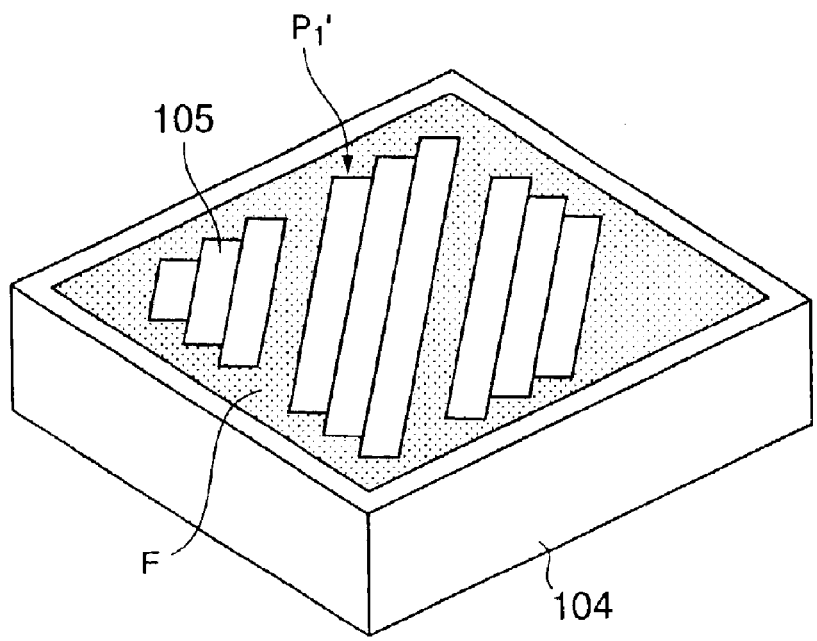
FIG. 38 is a perspective view of a large gapped prepreg-laminate having a large area formed by a wide-prepreg laminating unit included in the high-speed prepreg laminating apparatus shown in FIG. 28.

Then, the laminating head 106 of the four-axis automatic laminating machine 107 lays unidirectional and bidirectional wide prepregs 5 of 1 m in width for plane lamination on the parting film F to form a large gapped prepreg-laminate $P_1'$ having a large area as shown in FIG. 38.

In the meantime, the narrow-prepreg laminating unit 111 performs the steps performed by the narrow-prepreg laminating unit 111 in carrying out the foregoing high-speed prepreg laminating method to form a gridlike laminate $P_2$ as shown in FIG. 29.

Then, air is jetted through the small holes 102 of the flat laminating table 104 to float up the large gapped prepreg-laminate $P_1'$ together with the parting film F. The grippers 125 mounted on the carriages 124 of the sliding carrying machine 121 shown in FIGS. 31 and 32 grip the opposite side parts of the parting film F floating over the flat laminating table 104. The carriages 124 travel along the rails 122 and 123 to the adjacent prepreg-laminate cutting unit 108 to carry the large gapped prepreg-laminate $P_1'$ together with the parting film F in the air and to place the large gapped prepreg-laminate P₁' on the cutting table 109 of the prepreg-laminate cutting unit 108. The grippers 125 release the parting film F, and then air is sucked through the small holes 10 of the cutting table 109 to hold the large gapped prepreg-laminate P₁' and the parting film F on the cutting table 109 in close contact with the surface of the cutting table 109.

Figure 39:
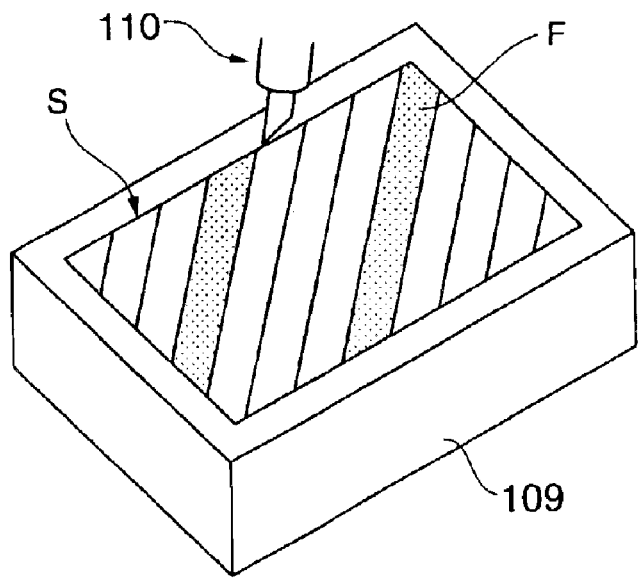
FIG. 39 is a perspective view of a gapped prepreg-laminate skin obtained by cutting the large gapped prepreg-laminate shown in FIG. 38 by the prepreg-laminate cutting machine.

Then, the automatic cutting machine 110 cuts the large prepreg-laminate P₁' in desired dimensions and a desired shape as shown in FIG. 39 to obtain a gapped prepreg-laminate skin S'.

After floating up the gapped prepreg-laminate skin S' together with the parting film F by jetting air through the small holes 102 of the cutting table 109, the hangers 120 of the crane 119 hold one side part of the parting film F. The crane 119 suspends the gapped prepreg-laminate skin S' like a suspended curtain as mentioned in connection with FIG. 34.

Figure 40:
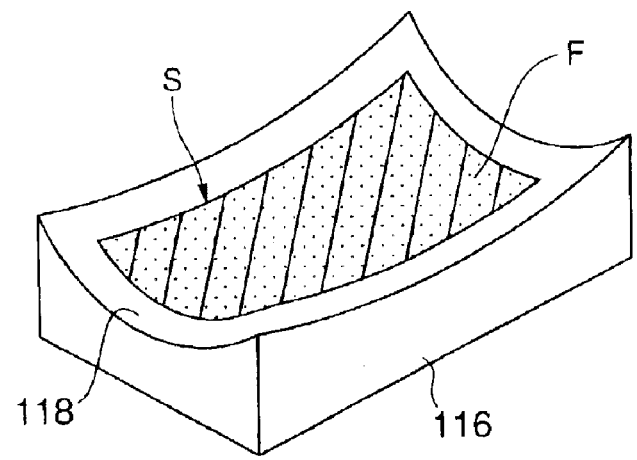
FIG. 40 is a perspective view of the gapped prepreg-laminate skin shown in FIG. 39 laid on a prepreg-laminate laminating mold having a double-contour molding surface.

The crane 119 travels laterally to carry the gapped prepreg-laminate skin S' in the air to a position above the prepreg-laminate laminating mold 116 and lays the gapped prepreg-laminate skin S' with the parting film F facing up on the double-contour molding surface 118 of the prepreg-laminate laminating mold 116 as shown in FIG. 40.

Figure 41:
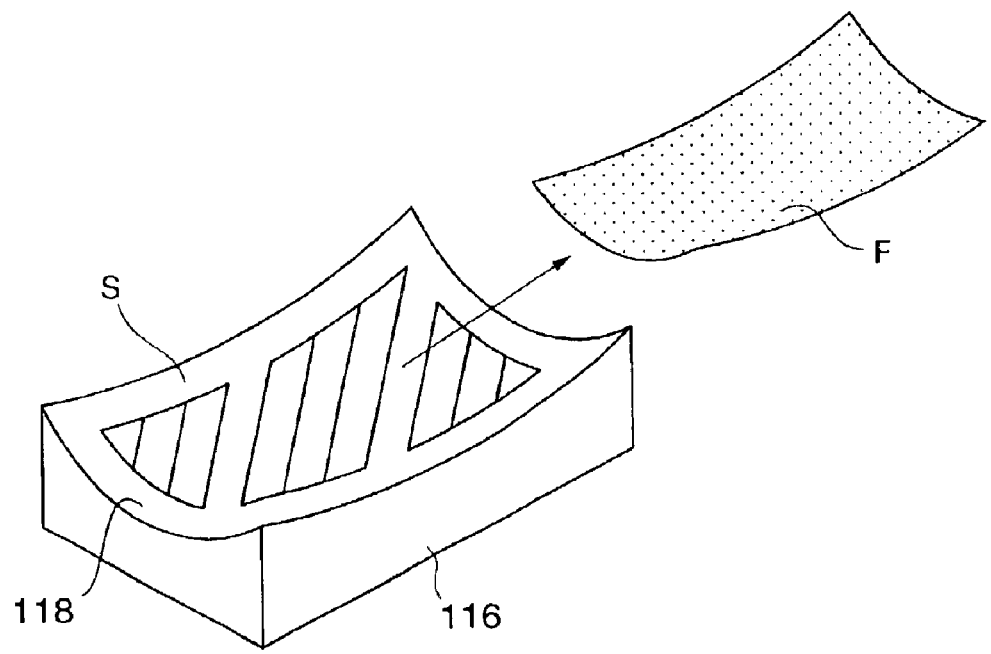
FIG. 41 is a perspective view of assistance in explaining forming the gapped prepreg-laminate skin shown in FIG. 40 in a shape conforming to the double-contour molding surface.
Figure 42:
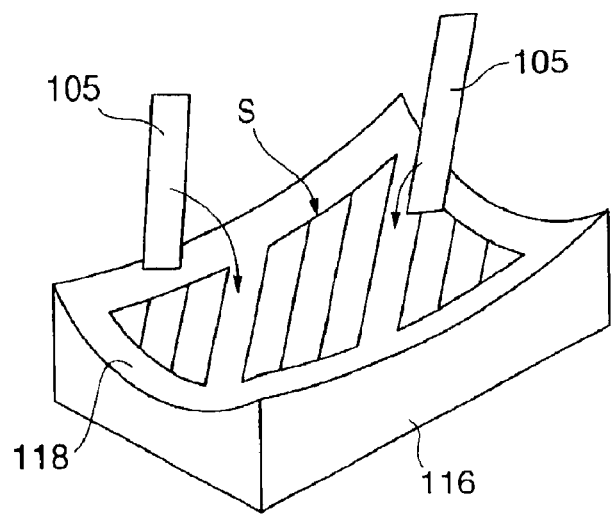
FIG. 42 is a perspective view of assistance in explaining additionally laying wide prepregs in gaps in the gapped prepreg-laminate skin shown in FIG. 41.

Then, the parting film F is separated from the gapped prepreg-laminate skin S' as shown in FIG. 41, and the gapped prepreg-laminate skin S' is shaped so as to conform to the double-contour molding surface 118.

Figure 43:
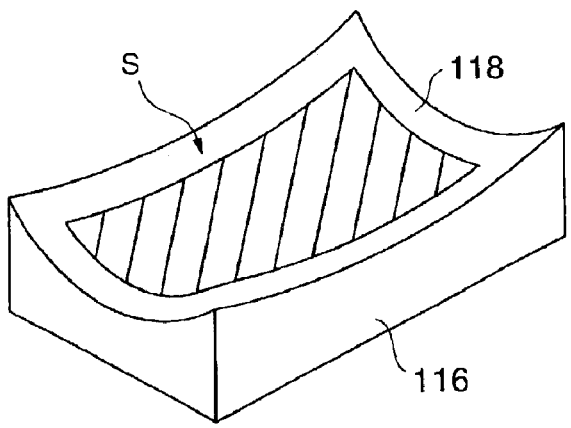
FIG. 43 is a perspective view of a gapless prepreg-laminate skin obtained by adding the wide prepregs as explained with reference to FIG. 42.

Subsequently, wide prepregs 105 are laid in gaps in the gapped prepreg-laminate skin S' as shown in FIG. 43 to obtain a gapless prepreg-laminate skin S as shown in FIG. 43.

In the meantime, the gridlike prepreg-laminate P₂ is carried in the air to the prepreg-laminate cutting unit 108 and is placed on the cutting table 109 by the foregoing carrying operations.

Then, the automatic cutting machine 110 cuts the gridlike prepreg-laminate P₂ in desired dimensions and a desired shape to obtain a prepreg-laminate doubler D. Then, the prepreg-laminate doubler D is carried in the air to a position above the prepreg-laminate laminating mold 116 and is laid with the parting film F facing up on the gapless prepreg-laminate skin S previously laid on the double-contour molding surface 118 of the prepreg-laminate laminating mold 116 by the foregoing operations.

Figure 44:
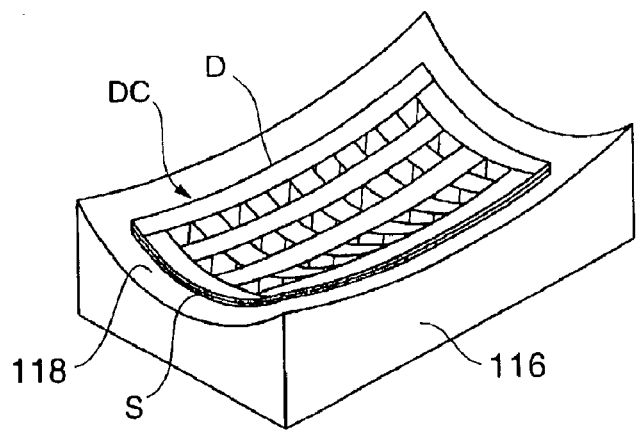
FIG. 44 is a perspective view of a composite panel having the shape of a double-contour molding surface formed by laminating the gapless prepreg-laminate skin shown in FIG. 43 and a prepreg-laminate doubler.

Then, the parting film F is separated from the prepreg-laminate doubler D and the gapless prepreg-laminate skin S and the prepreg-laminate doubler D are laminated to form a double-contour composite panel DC as shown in FIG. 44 for use as a wing panel.

As apparent from the foregoing description, according to the present invention, the high-speed prepreg laminating method performs the plane-lamination of wide prepregs and the plane-lamination of narrow prepregs in separate laminating areas. The wide-prepreg laminate and the narrow-prepreg laminate are successively cut in desired dimensions and desired shapes in a cutting area to obtain cut prepreg laminates. The cut prepreg laminates are laminated in a laminating area. In this case, the prepreg laminates are carried from the laminating areas to the cutting area in the air, and the cut prepreg laminates are carried from the cutting area to the laminating area in the air.

Therefore, the prepreg laminates and the cut prepreg laminates can safely and quickly be carried from area to area without being damaged. Thus, the high-speed prepreg laminating method can efficiently be carried out. Since the prepreg laminates and the cut prepreg laminates are floated up before carrying the same from area to area, the prepreg laminates and the cut prepreg laminates can easily be carried in the air. Since the prepreg laminates are held firmly in place for cutting in the cutting area by suction, the prepreg laminates can precisely be cut and, eventually, highly accurate prepreg-laminate structures can be formed by lamination.

The high-speed prepreg laminating apparatus according to the present invention is capable of easily, efficiently and surely carrying out the foregoing excellent high-speed prepreg laminating method according to the present invention. The high-speed prepreg laminating apparatus includes the prepreg laminating units, the prepreg-laminate cutting unit, the prepreg-laminate laminating molds and the crane provided with the hangers, which are constructed individually, and is simple in construction, lightweight and inexpensive. The high-speed prepreg laminating apparatus of the present invention is able to manufacture composite panels at a production rate higher than that at which the conventional large-scale all-in-one automatic laminating apparatus manufactures composite panels. All the component units and machines of the high-speed prepreg laminating apparatus of the present invention can effectively continuously be used without being kept unused to manufacture composite panels at a high production rate.

Third Embodiment

A third embodiment according to the present invention will be described with reference to the accompanying drawings. An automatic prepreg laminating apparatus for carrying out automatic prepreg laminating methods will be described with reference to FIG. 45.

A wide-prepreg laminating unit 201 includes a flat laminating table (first flat laminating table) 202 of 10 m in width and 15 m in length; and an automatic laminating machine 205 provided with a four-axis laminating head 204 held above the flat laminating table 202 to lay unidirectional and/or bidirectional wide prepregs 203 of a width greater than 1 m for plane lamination on the flat laminating table 202.

A prepreg-laminate cutting unit 206 adjoining the wide-prepreg laminating unit 201 includes a cutting table 207 of 10 m in width and 15 m in length; and an automatic cutting machine 208 held above the cutting table 207.

A narrow-prepreg laminating unit 209 adjoining the prepreg-laminate cutting unit 206 includes a flat laminating table (second flat laminating table) 210 of 10 m in width and 15 m in length; and an automatic laminating machine 213 provided with a four-axis laminating head 212 held above the flat laminating table 210 to lay narrow prepreg tapes 113 of a width in the range of 1 to 20 cm longitudinally, laterally and diagonally at intervals for plane lamination on the flat laminating table 210.

A prepreg-laminate laminating mold 214 is disposed so as to adjoin the prepreg-laminate cutting unit 206 on one side of the longitudinal arrangement of the wide-prepreg laminating unit 201, the prepreg-laminate cutting unit 206 and the narrow-prepreg laminating unit 209.

Figure 45:
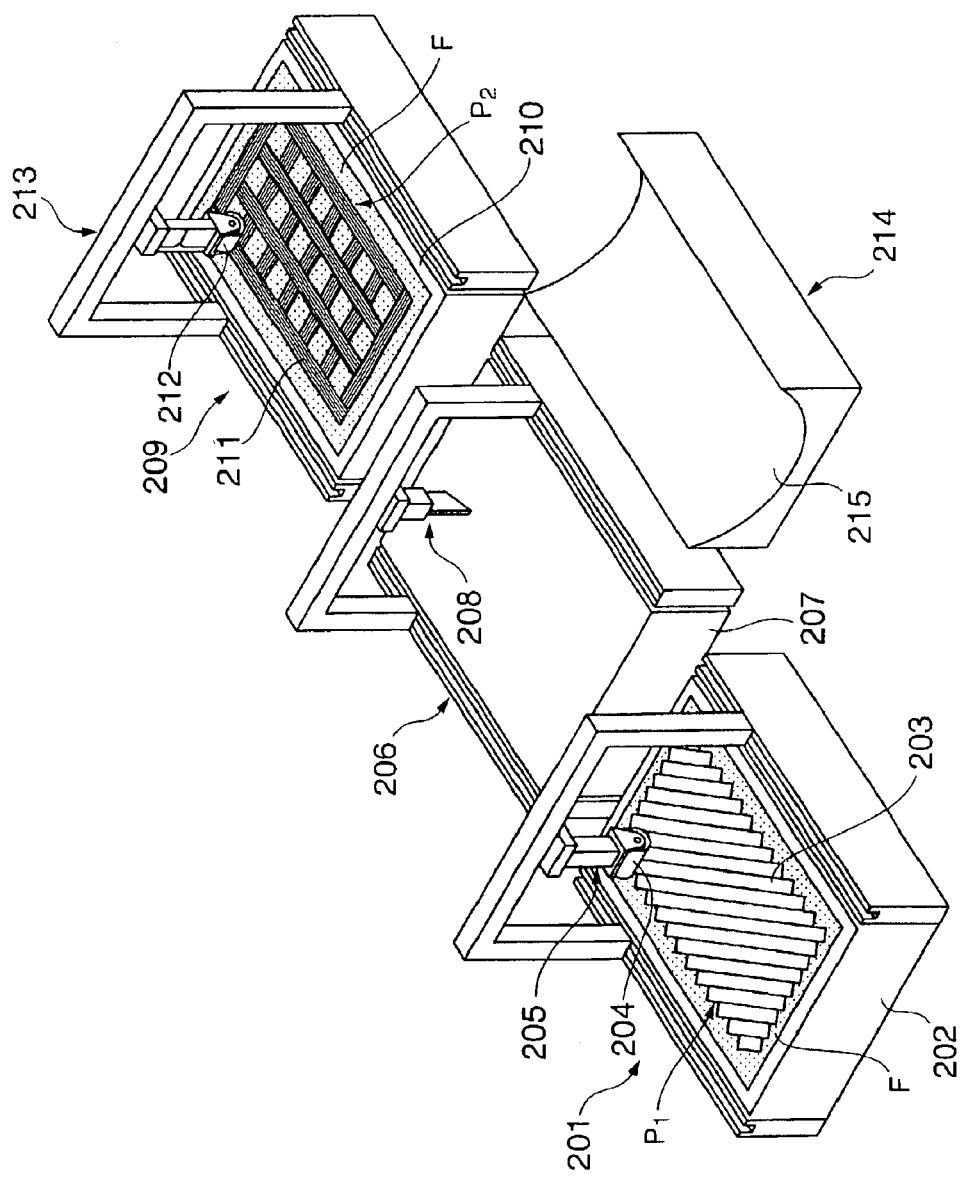
FIG. 45 is a schematic perspective view of an automating prepreg laminating apparatus in a third embodiment according to the present invention.
Figure 46:
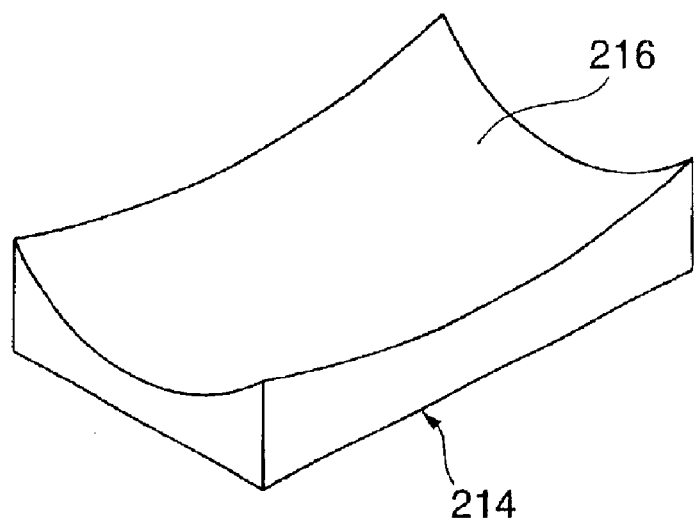
FIG. 46 is a perspective view of another prepreg-laminate laminating mold for the automatic prepreg laminating apparatus shown in FIG. 45.

The automatic prepreg laminating apparatus employs a prepreg-laminate laminating mold 214 having a single-contour molding surface 215 as shown in FIG. 45 or a prepreg-laminate laminating mold 214 having a double-contour molding surface 118 as shown in FIG. 46.

Automatic prepreg laminating methods embodying the present invention to be carried out by the foregoing automatic prepreg laminating apparatus will be described.

An automatic prepreg laminating method of laminating prepregs to manufacture a single-contour prepreg-laminate structure employs the prepreg-laminate laminating mold 214 having the single-contour molding surface 215 as shown in FIG. 45. The steps of the automatic prepreg laminating method will be described.

Referring to FIG. 45, a parting film F is spread on the flat laminating table 202 of the wide-prepreg laminating unit 201. Then, the laminating head 204 of the four-axis automatic laminating machine 205 lays unidirectional and/or bidirectional wide prepregs 203 of 1 m in width for plane lamination on the parting film F to form a large prepreg-laminate $P_1$ having a large area.

In the meantime, a parting film F is spread on the flat laminating table 210 of the narrow-prepreg laminating unit 209. Then, the laminating head 212 of the four-axis automatic laminating machine 213 lays unidirectional and/or bidirectional narrow prepregs 211 of a width in the range of 1 to 20 cm longitudinally and laterally for plane lamination on the parting film F to form a gridlike prepreg-laminate $P_2$.

Figure 47:
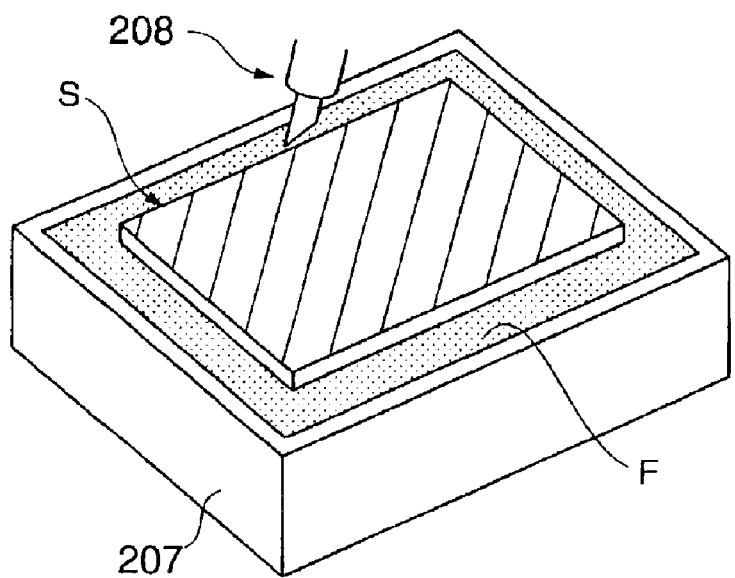
FIG. 47 is a perspective view of a prepreg-laminate skin obtained by cutting a large prepreg-laminate having a large area by a prepreg-laminate cutting unit included in the automatic prepreg laminating apparatus shown in FIG. 45.

Then, the large prepreg-laminate $P_1$ is carried together with the parting film F to place the large prepreg-laminate $P_1$ with the parting film F facing down on the cutting table 207 of the prepreg-laminate cutting unit 206. The automatic cutting machine 208 cuts the large prepreg-laminate $P_1$ in desired dimensions and a desired shape as shown in FIG. 47 to obtain a prepreg-laminate skin S.

Figure 48:
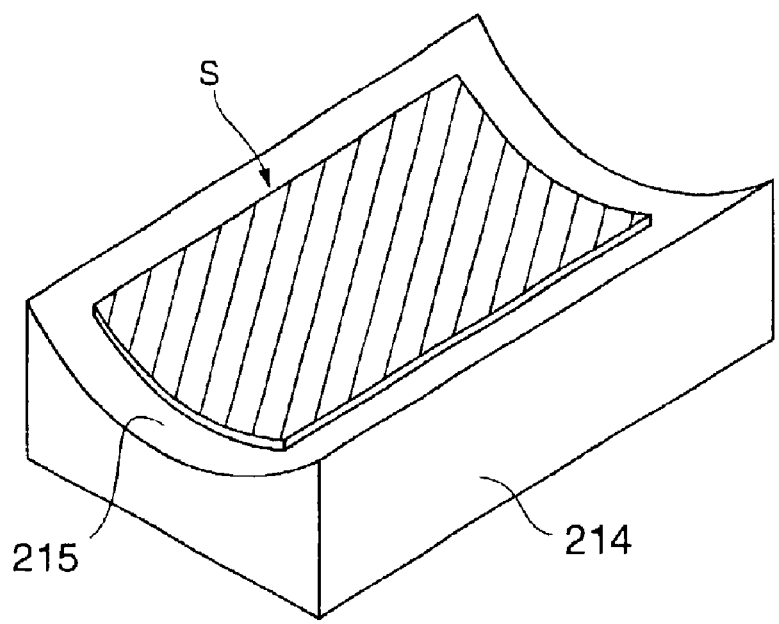
FIG. 48 is a perspective view of a prepreg-laminate skin laid on a prepreg-laminate laminating mold having a single-contour molding surface included in the automatic prepreg laminating apparatus shown in FIG. 45.

Then, the prepreg-laminate skin S is separated from the parting film F on the cutting table 207, and the prepreg-laminate skin S is laid on the single-contour molding surface 215 of the prepreg-laminate laminating mold 214 as shown in FIG. 48.

Figure 49:
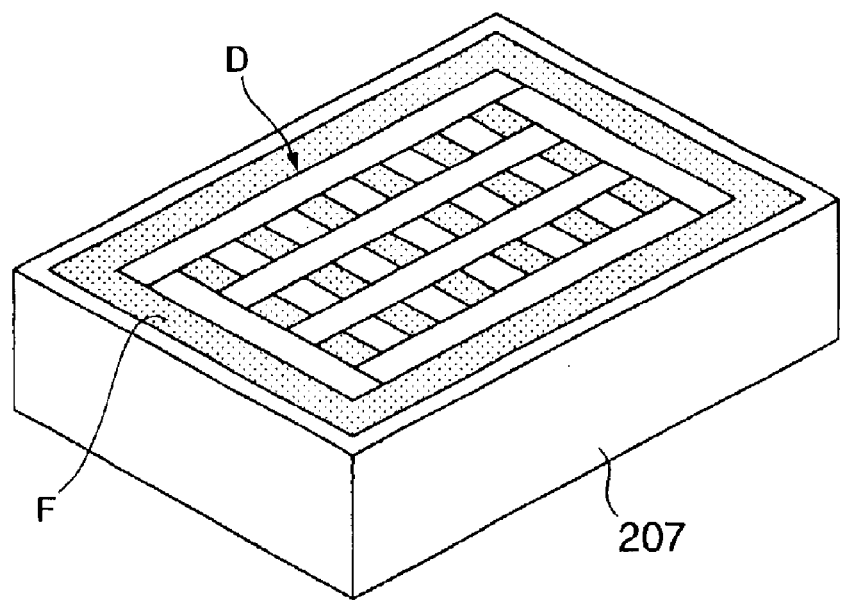
FIG. 49 is a perspective view of a prepreg-laminate doubler obtained by cutting a gridlike prepreg-laminate by the prepreg-laminate cutting unit included in the automatic prepreg laminating apparatus shown in FIG. 45.
Figure 50:
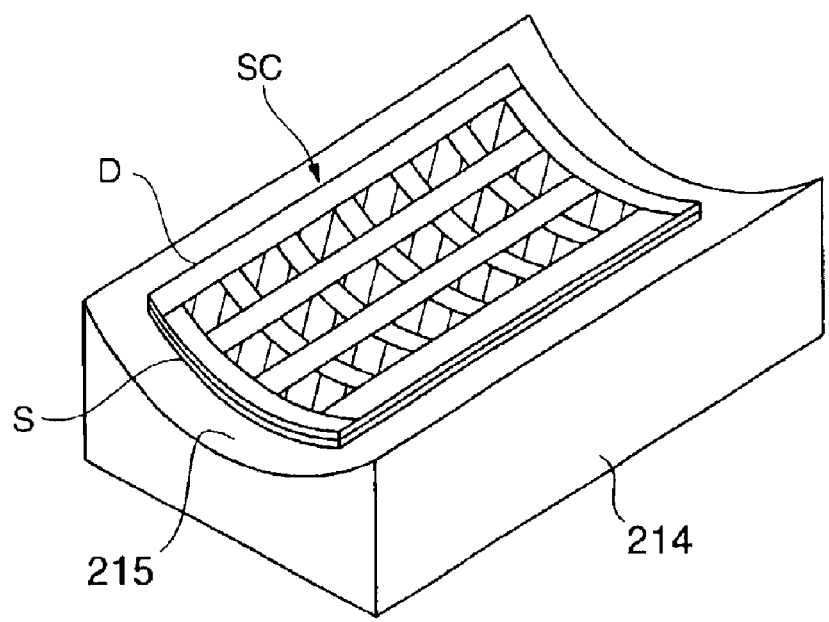
FIG. 50 is a perspective view of a composite panel having the shape of a single-contour molding surface obtained by laminating the prepreg-laminate skin shown in FIG. 48 and the prepreg-laminate doubler shown in FIG. 49.

Subsequently, the gridlike prepreg-laminate $P_2$ is carried together with the parting film F to the adjacent prepreg-laminate cutting unit 206, and is placed with the parting film F facing down on the cutting table 207 of the prepreg-laminate cutting unit 206. Then, the automatic cutting machine 208 cuts the gridlike prepreg-laminate $P_2$ in desired dimensions and a desired shape to obtain a prepreg-laminate doubler D as shown in FIG. 49. The prepreg-laminate doubler D is carried together with the parting film F to the prepreg-laminate laminating mold 214, and is laid with the parting film F facing up on the prepreg-laminate skin S previously laid on the single-contour molding surface 215 of the prepreg-laminate laminating mold 214. Then, the parting film F is removed from the prepreg-laminate doubler D and the prepreg-laminate skin S and the prepreg-laminate doubler D are laminated to form a single-contour composite panel SC as shown in FIG. 50 for use as a fuselage panel.

An automatic prepreg laminating method of laminating prepregs to manufacture a double-contour prepreg-laminate structure employs the prepreg-laminate laminating mold 214 having the double-contour molding surface 216 as shown in FIG. 46. The steps of the automatic prepreg laminating method will be described.

Figure 51:
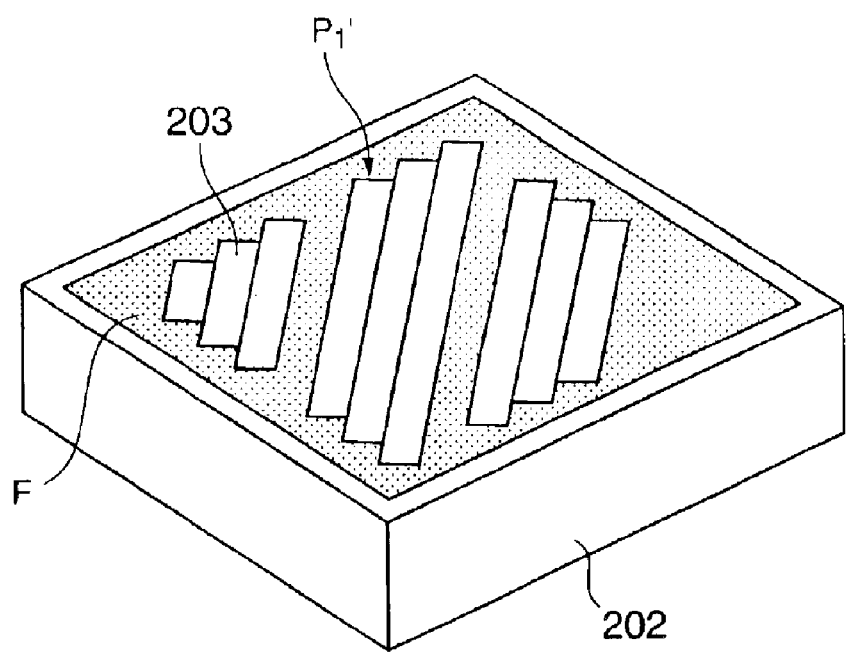
FIG. 51 is a perspective view of a large gapped prepreg-laminate having a large area formed by a wide-prepreg laminating unit included in the automatic prepreg laminating apparatus shown in FIG. 45.

A parting film F is spread on the flat laminating table 202 of the wide-prepreg laminating unit 201 shown in FIG. 45. Then, the laminating head 204 of the four-axis automatic laminating machine 205 lays unidirectional and/or bidirectional wide prepregs 203 of 1 m in width for plane lamination on the parting film F to form a large gapped prepreg-laminate $P_1'$ having a large area as shown in FIG. 15 having a large area as shown in FIG. 51.

Figure 52:
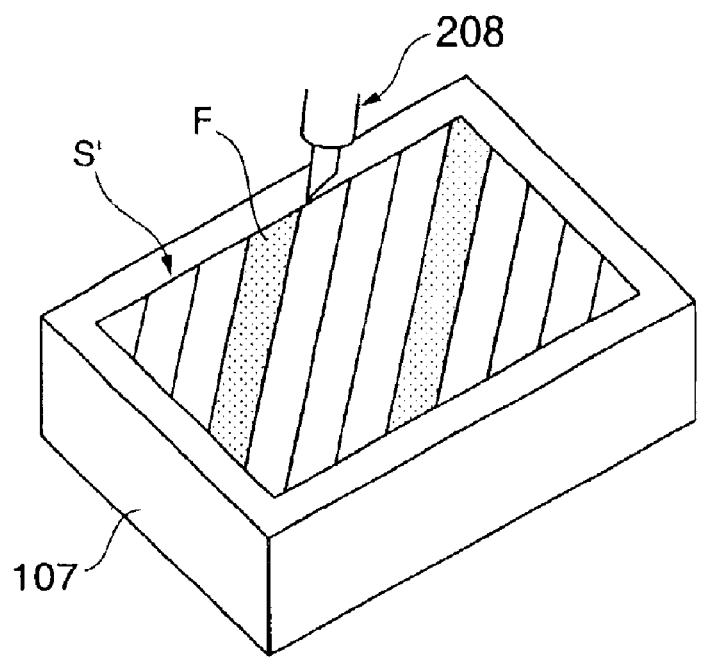
FIG. 52 is a perspective view of a gapped prepreg-laminate skin obtained by cutting the large gapped prepreg-laminate shown in FIG. 51 by the prepreg-laminate cutting unit.

In the meantime, the narrow-prepreg laminating unit 209 forms a gridlike prepreg-laminate $P_2$ by the same operations as those of the foregoing automatic prepreg-laminate manufacturing method. Then, the large gapped prepreg-laminate $P_1'$ is carried together with the parting film F to place the large gapped prepreg-laminate $P_1'$ with the parting film F facing down on the cutting table 207 of the prepreg-laminate cutting unit 206. The automatic cutting machine 208 cuts the large gapped prepreg-laminate $P_1'$ in desired dimensions and a desired shape to obtain a gapped prepreg-laminate skin S' as shown in FIG. 52.

Figure 53:
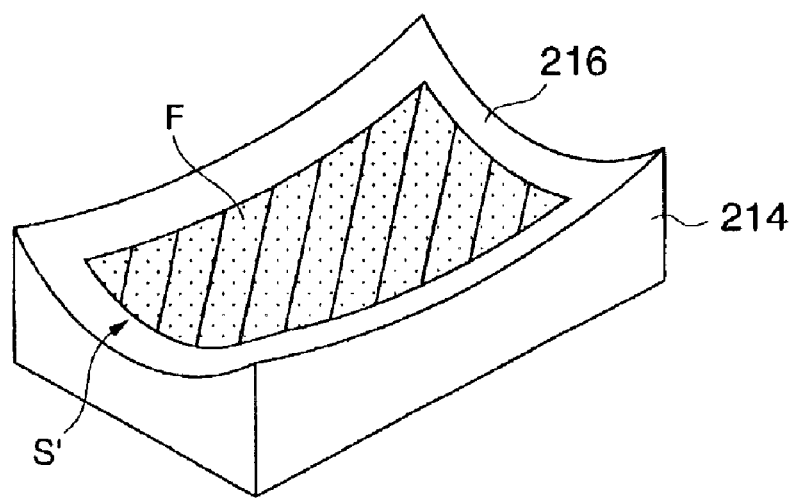
FIG. 53 is a perspective view of the gapped prepreg-laminate skin shown in FIG. 52 laid on a prepreg-laminate laminating mold having a double-contour molding surface.

Then, the gapped prepreg-laminate skin S' is carried together with the parting film F, and the gapped prepreg-laminate skin S' is laid with the parting film F facing up on the double-contour molding surface 216 of the prepreg-laminate laminating mold 214 as shown in FIG. 53.

Figure 54:
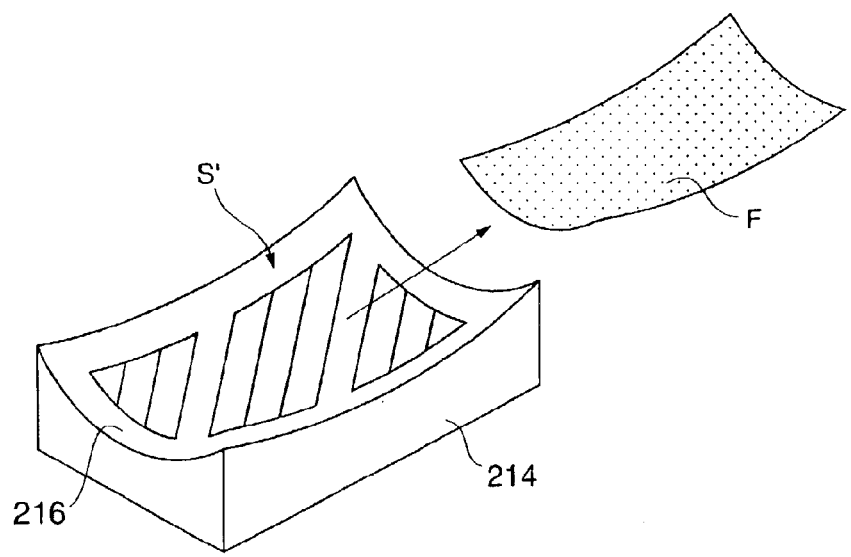
FIG. 54 is a perspective view of assistance in explaining forming the gapped prepreg-laminate skin shown in FIG. 53 in a shape conforming to the double-contour molding surface.
Figure 55:
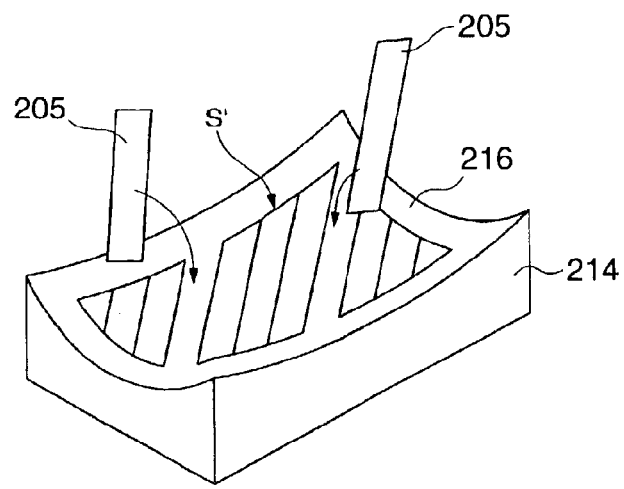
FIG. 55 is a perspective view of assistance in explaining additionally laying wide prepregs in gaps in the gapped prepreg-laminate skin shown in FIG. 54.
Figure 56:
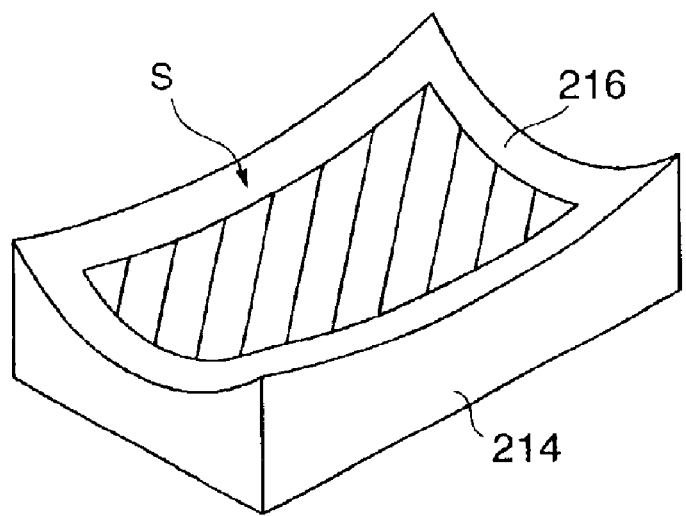
FIG. 56 is a perspective view of a gapless prepreg-laminate skin formed by additionally laying the wide prepregs in gaps in the gapped prepreg-laminate skin as explained with reference to FIG. 55.

Then, the parting film F is separated from the gapped prepreg-laminate skin S', and the gapped prepreg-laminate skin S' is shaped so as to conform to the double-contour molding surface 216 as shown in FIG. 54. Wide prepregs 205 are laid additionally in gaps in the gapped prepreg-laminate skin S' to obtain a gapless prepreg-laminate skin S as shown in FIG. 55.

In the meantime, the gridlike prepreg-laminate $P_2$ is carried together with the parting film F to the adjacent prepreg-laminate cutting unit 206, and is laid with the parting film F facing down on the cutting table 207 of the prepreg-laminate cutting unit 206.

Then, the automatic cutting machine 208 cuts the gridlike prepreg-laminate $P_2$ in desired dimensions and a desired shape to obtain a prepreg-laminate doubler D as shown in FIG. 49. The prepreg-laminate doubler D is carried together with the parting film F to the prepreg-laminate laminating mold 214, and is laid with the parting film F facing up on the gapless prepreg-laminate skin S previously laid on the double-contour molding surface 216 of the prepreg-laminate laminating mold 214.

Figure 57:
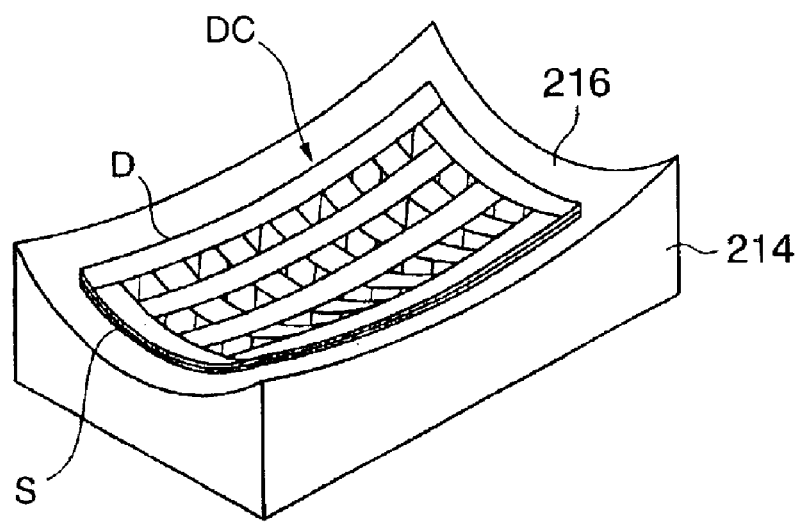
FIG. 57 is a perspective view of a composite panel formed in the shape of a double-contour molding surface by laminating the gapless prepreg-laminate skin shown in FIG. 56 and a prepreg-laminate doubler.

Then, the parting film F is removed from the prepreg-laminate doubler D and the gapless prepreg-laminate skin S and the prepreg-laminate doubler D are laminated to form a double-contour composite panel DC as shown in FIG. 57 for use as a wing panel.

As apparent from the foregoing description, according to the present invention, the automatic prepreg laminating method performs the plane-lamination of wide prepregs and the plane-lamination of narrow prepregs in separate laminating areas. Therefore, the prepreg laminates can simply and quickly be formed. Since the prepreg laminates are cut separately in desired dimensions and desired shapes, respectively, the prepreg laminates can accurately and precisely be cut. Since the cut prepreg laminates are laminated, highly accurate prepreg-laminate structures can be formed by lamination. Thus, the automatic prepreg laminating method is a useful composite panel forming method.

The automatic prepreg laminating apparatus according to the present invention is capable of easily, efficiently and surely carrying out the foregoing excellent automatic prepreg laminating method according to the present invention. The automatic prepreg laminating apparatus includes the prepreg laminating units, the prepreg-laminate cutting unit and the prepreg-laminate laminating molds, which are constructed individually, and is simple in construction, lightweight and inexpensive. The automatic prepreg laminating apparatus of the present invention is able to manufacture composite panels at a production rate higher than that at which the conventional large-scale all-in-one automatic laminating apparatus manufactures composite panels. All the component units and machines of the automatic prepreg laminating apparatus of the present invention can effectively continuously be used without being kept unused to manufacture composite panels at a high production rate.

What is claimed is:

1. An automatic prepreg laminating method comprising the steps of:

spreading a first parting film on a first flat laminating table in close contact with a surface of the first flat laminating table, and laying a plurality of wide prepregs on the first parting film to form a large prepreg-laminate having a large area;

spreading a second parting film on a second flat laminating table in close contact with a surface of the second flat laminating table, and laying a plurality of narrow prepregs at intervals on the second parting film to form a narrow prepreg-laminate;

cutting the large prepreg-laminate on a cutting table to form a prepreg-laminate skin;

cutting the narrow prepreg-laminate on the cutting table to form a prepreg-laminate doubler; and successively carrying the prepreg-laminate skin and the prepreg-laminate doubler from the cutting table onto a laminating mold to laminate the prepreg-laminate skin and the prepreg-laminate doubler.

2. The automatic prepreg laminating method according to claim 1, wherein the first parting film and the large prepreg-laminate laid on the first flat laminating table are floated up by air jetted from the first flat laminating table, are carried in the air and are laid on the cutting table with the first parting film facing the cutting table, the second parting film and the narrow prepreg-laminate laid on the second flat laminating table are floated up by air jetted from the second flat laminating table, are carried in the air and are laid on the cutting table with the second parting film facing the cutting table, and the prepreg-laminate skin and the prepreg-laminate doubler are suspended in the air like a suspended curtain in carrying the prepreg-laminate skin and the prepreg-laminate doubler from the cutting table onto the laminating mold.

3. The automatic prepreg laminating method according to claim 1, wherein the molding surface of the laminating mold is a single-contour molding surface, the prepreg-laminate skin is pulled up with the first parting film held by suction on the cutting table to separate the prepreg-laminate skin from the first parting film in suspending the prepreg-laminate skin, and the prepreg-laminate doubler is pulled up together with the second parting film from the cutting table in suspending the prepreg-laminate doubler, the prepreg-laminate doubler is carried in the air together with the second parting film, the prepreg-laminate doubler is laid with the second parting film facing up on the prepreg-laminate skin laid on the laminating mold to laminate the prepreg-laminate doubler to the prepreg-laminate skin, and then the second parting film is removed.

4. The automatic prepreg laminating method according to claim 2, wherein the laminating mold has a double-contour molding surface, when forming the large prepreg-laminate having a large area, the first parting film is spread on the first flat table in close contact with the surface of the first flat table and the wide prepregs are arranged at intervals on the first parting film;

when forming the prepreg-laminate skin on the cutting table by cutting the large prepreg-laminate, the prepreg-laminate skin becomes gapped; and after laminating the gapped prepreg-laminate skin on the laminating mold, wide prepregs are additionally laid in gaps in the gapped prepreg-laminate skin on the laminating mold.

5. The automatic prepreg laminating method according to claim 4, wherein the prepreg-laminate doubler is pulled up together with the second parting film from the cutting table, is carried together with the second parting film in the air and is laminated with the second parting film facing up to the gapless prepreg-laminate skin formed on the laminating mold, and then the second parting film is removed.

6. The automatic prepreg laminating method according to claim 1 further comprising the steps of:

spreading a third parting film on a third flat laminating table, holding the third parting film in close contact with the surface of the third flat laminating table by suction, and forming a scattered prepreg-laminate by laying narrow prepregs in a scattered arrangement and laminating the narrow prepregs on the third parting film; and forming a prepreg-laminate local reinforcement by cutting the scattered prepreg laminate on the cutting table; wherein the prepreg-laminate local reinforcement is carried from the cutting table and laminated to a laminate structure formed on the laminating mold by laminating the prepreg-laminate skin and the prepreg-laminate doubler.

7. The automatic prepreg laminating method according to claim 6, wherein the prepreg laminate skin is pulled up with the first parting film held by suction on the cutting table to separate the prepreg-laminate skin from the first parting film in suspending the prepreg-laminate skin, the prepreg-laminate doubler and the prepreg-laminate local reinforcement are pulled up, respectively, together with the second parting film and the third parting film from the cutting table in suspending the prepreg laminate doubler and the prepreg-laminate local reinforcement, the prepreg-laminate doubler and the prepreg-laminate local reinforcement are carried in the air together with the second parting film and the third parting film, respectively, the second parting film is removed after laying the prepreg-laminate doubler with the second parting film facing up on the prepreg-laminate skin, the third parting film is removed after laying the prepreg-laminate local reinforcement with the third parting film facing up on the prepreg-laminate doubler laid on the prepreg-laminate skin laid on the laminating mold when laminating the prepreg-laminate skin, the prepreg-laminate doubler and the prepreg-laminate local reinforcements.

8. The automatic prepreg laminating method according to claim 6, wherein the laminating mold has a double-contour molding surface, when forming the large prepreg-laminate having a large area, the first parting film is spread on the fist flat table in close contact with the first flat table and the wide prepregs are arranged at intervals on the first parting film; and when forming the prepreg-laminate skin on the cutting table by cutting the large gapped prepreg-laminate, the prepreg-laminate skin becomes gapped; and after laminating the gapped prepreg laminate skin on the laminating mold, wide prepregs are additionally laid in gaps in the gapped prepreg-laminate skin on the laminating mold.

9. The automatic laminating method according to claim 1, wherein the large prepreg-laminate having a large area is formed by laying wide unidirectional and/or bidirectional prepregs in a four-axis control mode on the first parting film spread on the first flat laminating table in close contact with the surface of the first flat laminating table.

10. The automatic prepreg laminating method according to claim 1, wherein the narrow prepreg-laminate is formed by longitudinally and laterally laying narrow unidirectional and/or bidirectional prepregs respectively having different widths at predetermined intervals in a four-axis control mode on the second parting film spread on the second flat laminating table in close contact with the surface of the second laminating table.

11. An automatic prepreg laminating method comprising the steps of:

forming a large prepreg-laminate having a large area by laminating a plurality of wide prepregs on a first flat laminating table;

forming a narrow prepreg-laminate by laminating a plurality of narrow prepregs on a second flat laminating table;

forming a prepreg-laminate skin by cutting the large prepreg-laminate on a cutting table;

forming a prepreg-laminate doubler by cutting the narrow prepreg-laminate on the cutting table; and successively carrying the prepreg-laminate skin and the prepreg-laminate doubler from the cutting table unto a laminating mold having a contour molding surface.

12. The automatic prepreg laminating method according to claim 11, wherein the laminating mold has a double-contour molding surface, when forming the large prepreg-laminate having a large area the wide prepregs are arranged at intervals;

when forming the large prepreg-laminate skin on the cutting table by cutting the large prepreg-laminate, the prepreg-laminate skin becomes gapped; and after laminating the gapped prepreg-laminate skin on the laminating mold, wide prepregs are additionally laid in gaps in the gapped prepreg-laminate skin on the laminating mold.

13. The automatic prepreg laminating method according to claim 11, wherein the large prepreg-laminate having a large area is formed by laying wide unidirectional and/or bidirectional prepregs in a four-axis control mode on a first parting film spread on the first flat laminating table in close contact with the surface of the first flat laminating table.

14. The automatic prepreg laminating method according to claim 11, wherein the narrow prepreg-laminate is formed by longitudinally and laterally laying narrow unidirectional and/or bidirectional prepregs respectively having different widths at predetermined intervals in a four-axis control mode on a second parting film spread on the second flat laminating table in close contact with the surface of the second laminating table.

* * * * *